United States Patent
Johnson et al.

(10) Patent No.: US 10,108,572 B1
(45) Date of Patent: *Oct. 23, 2018

(54) PIPELINED I/O ADAPTER DEVICE WITH LOW-LATENCY WRITE REQUESTS RETRIES

(71) Applicant: Amazon Technologies, Inc., Seattle, WA (US)

(72) Inventors: Robert Michael Johnson, Austin, TX (US); Marc John Brooker, Seattle, WA (US); Marc Stephen Olson, Bellevue, WA (US); Mark Bradley Davis, Austin, TX (US); Norbert Paul Kusters, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,779

(22) Filed: Feb. 2, 2018

Related U.S. Application Data

(63) Continuation of application No. 14/672,658, filed on Mar. 30, 2015, now Pat. No. 9,886,405.

(51) Int. Cl.
*G06F 3/00* (2006.01)
*G06F 13/38* (2006.01)
(Continued)

(52) U.S. Cl.
CPC ............ *G06F 13/387* (2013.01); *G06F 3/067* (2013.01); *G06F 3/0619* (2013.01);
(Continued)

(58) Field of Classification Search
CPC ..... G06F 3/0626; G06F 13/387; G06F 11/1443
See application file for complete search history.

(56) References Cited

U.S. PATENT DOCUMENTS 6,298,370 B1  10/2001  Tang et al.
6,925,641 B1  8/2005   Elabd et al.
(Continued)

OTHER PUBLICATIONS

U.S. Appl. No. 14/620,764, filed Feb. 12, 2015, Titled: Servicing I/O Requests in an I/O Adapter Device.
(Continued)

*Primary Examiner* — Tammara R Peyton
(74) *Attorney, Agent, or Firm* — Kilpatrick Townsend & Stockton LLP

(57) ABSTRACT

Server computers may include one or more input/output (I/O) adapter devices for communicating with a network and/or direct-attached device. The I/O adapter device may implement processes to manage write requests in a general and flexible manner. The I/O adapter device may also implement processes to manage write requests in a fast an efficient—that is, low latency—manner. Low latency write requests processes may include determining that a write packet for a write request can be processed without additional assistance from a processor, once a processor has initiated a memory access request to fetch write data and also generated protocol information for transmitting the write packet. The I/O adapter device may then process and transmit the write packet through an offload pipeline, without interrupting a processor.

20 Claims, 12 Drawing Sheets

(51) Int. Cl.
*G06F 11/30* (2006.01)
*G06F 3/06* (2006.01)
*G06F 11/14* (2006.01)
*G06F 13/42* (2006.01)

(52) U.S. Cl.
CPC ........ *G06F 3/0659* (2013.01); *G06F 11/1443* (2013.01); *G06F 11/3027* (2013.01); *G06F 11/3037* (2013.01); *G06F 13/423* (2013.01); *G06F 2201/815* (2013.01)

(56) References Cited

U.S. PATENT DOCUMENTS

| | | |
|---|---|---|
| 7,835,380 B1 | 11/2010 | Aloni et al. |
| 7,992,144 B1 | 8/2011 | Hendel et al. |
| 8,427,347 B1 | 4/2013 | Chai et al. |
| 9,378,049 B1 | 6/2016 | Johnson et al. |
| 9,864,538 B1 | 1/2018 | Johnson et al. |
| 9,886,405 B1 | 2/2018 | Johnson et al. |
| 9,946,307 B2 * | 4/2018 | Lutz, III ............. E05D 11/1064 |
| 2003/0090702 A1 | 5/2003 | Trelewicz et al. |
| 2008/0320476 A1 | 12/2008 | Wingard et al. |
| 2009/0055826 A1 | 2/2009 | Bernstein et al. |
| 2009/0150748 A1 | 6/2009 | Egner et al. |
| 2009/0245097 A1 | 10/2009 | Takakuwa et al. |
| 2012/0297039 A1 | 11/2012 | Acuna et al. |
| 2013/0198571 A1 | 8/2013 | Brewerton et al. |
| 2013/0262958 A1 | 10/2013 | Ruggiero et al. |
| 2014/0115423 A1 | 4/2014 | Cooke et al. |
| 2015/0039577 A1 | 2/2015 | Talagala et al. |
| 2015/0178161 A1 | 6/2015 | Burd et al. |
| 2015/0212844 A1 | 7/2015 | Tsirkin et al. |
| 2015/0349805 A1 | 12/2015 | Tsai et al. |

OTHER PUBLICATIONS

U.S. Appl. No. 14/671,800, filed Mar. 27, 2015, Titled: Payload Checksum Interval.
U.S. Appl. No. 14/672,658 , "Non-Final Office Action", dated May 5, 2017, 10 pages.
U.S. Appl. No. 14/672,658 , "Notice of Allowance", dated Oct. 4, 2017, 10 pages.
U.S. Appl. No. 14/673,474, filed Mar. 30, 2015, Titled: Streaming Interconnect Architecture.
U.S. Appl. No. 14/750,926, filed Jun. 25, 2015, Titled: Data Size Reduction.
U.S. Appl. No. 15/189,231, filed Jun. 22, 2016, Titled: Servicing I/O Requests in an I/O Adapter Device.
Kornaros et al., "Pipelined multi-queue management in a vlsi atm switch chip with credit-based flow-control", Advanced Research in VLSI, 1997. Proceedings., Seventeenth Conference on. IEEE (1997), pp. 127-144.
Ridenour et al., "Low-power buffer management for streaming data", Circuits and Systems for Video Technology, IEEE Transactions (2007), pp. 143-157.
Tzeng et al., "Task management for irregular-parallel workloads on the GPU", Proceedings of the Conference on High Performance Graphics. Eurographics Association (2010), pp. 29-37.

\* cited by examiner

PIPELINED I/O ADAPTER DEVICE WITH LOW-LATENCY WRITE REQUESTS RETRIES

CROSS REFERENCE TO RELATED APPLICATIONS

This application is a Continuation of U.S. application Ser. No. 14/672,658, filed Mar. 30, 2015, and titled "LOW LATENCY WRITE REQUESTS OVER A NETWORK USING A PIPELINED I/O ADAPTER DEVICE," issued as U.S. Pat. No. 9,886,405 on Feb. 6, 2018, the contents of which are herein incorporated in its entirety.

BACKGROUND

Server computers often include one or more input/output (I/O) devices. For example, a server computer may include one or more I/O adapter devices for communicating with a network and/or direct-attached storage device. Each I/O device may communicate over multiple, possibly asynchronous interfaces, such as PCI Express (PCIe) and/or Ethernet. For example, a host server computer may send I/O transactions over a PCIe bus to the I/O adapter device, and the I/O adapter device may send those I/O transactions over an Ethernet cable for processing by another server.

The I/O adapter device may implement software and/or hardware to process write requests in a general and flexible manner. This allows the I/O adapter device to manage the most variants of write requests, special write cases, and any errors. The I/O adapter device may also implement software and/or hardware to process write requests in a fast and efficient manner. A faster and more efficient implementation may allow the I/O adapter device to process a write request more quickly than when it uses the general and flexible implementation.

BRIEF DESCRIPTION OF THE DRAWINGS

Various embodiments in accordance with the present disclosure will be described with reference to the drawings, in which.

DETAILED DESCRIPTION

Figure 1:
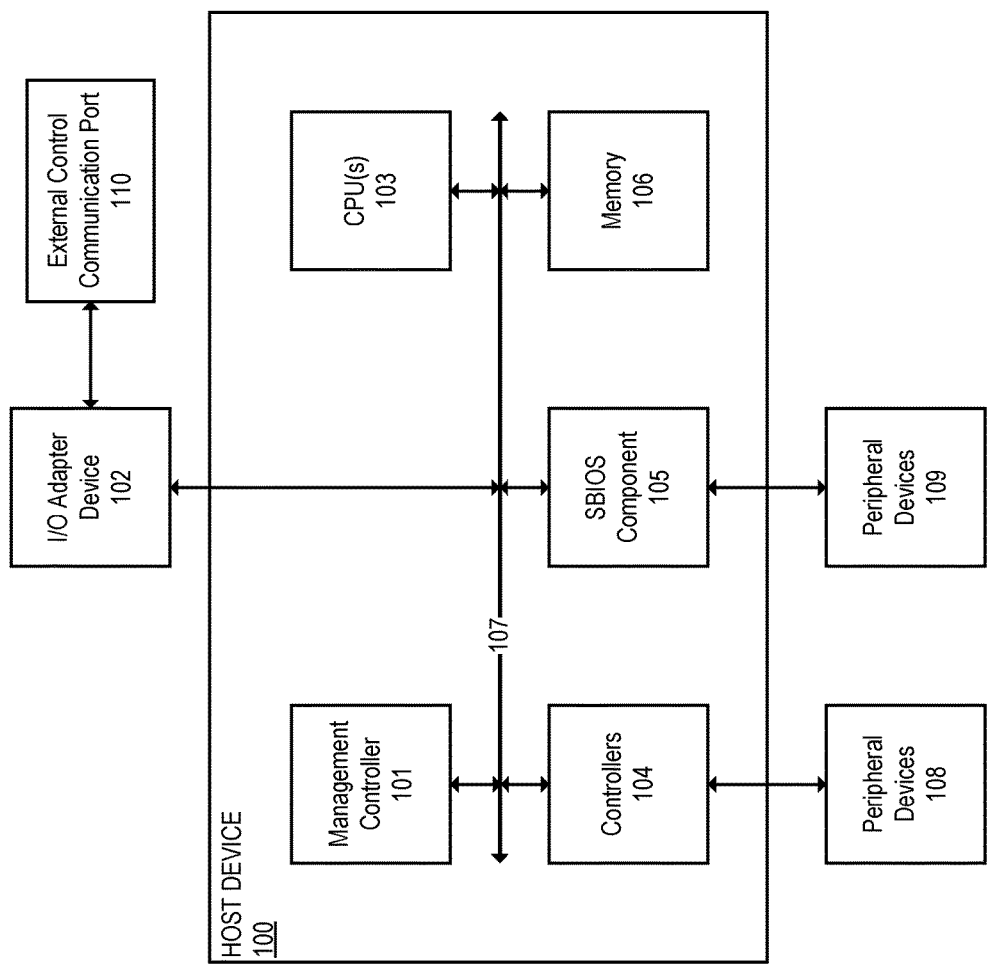
FIG. 1 shows a host device in communication with an I/O adapter device according to one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) or a System on Chip (SoC) comprising digital logic operable to send and receive packets.

Techniques are described herein for processing write requests in an I/O adapter device. Specifically discussed is low latency write request processing. An I/O adapter device is a device attached to or incorporated into a host computing device. The I/O adapter device receives requests from the host device to read data from, or write data to a storage location. The I/O adapter device may include software and/or hardware configured to process write data requests in a general and flexible manner. Processing write requests in a general and flexible manner allows the I/O adapter device to manage most variants of write requests, special write cases, and errors that may occur during the processing of the request. The most flexible approach, however, may not be the most efficient or fastest. For example, general and flexible processing of the write request may involve execution paths that may interrupt a processor multiple times for resolving the various stages for completing the write request, such as the memory access request, protocol header generation, etc. In some embodiments, performing of operations by a processor may be the slowest step in any execution path.

The I/O adapter device may provide more than one way to process a write request. The I/O adapter device may provide a process that minimizes interruptions to the processors. Because this process may be faster and more efficient than the general approach, it is referred to as low latency write request processing. Some write requests can be processed as low latency write requests. When such is the case, the operations that require a processor may be executed in advance. For example, a processor may generate protocol information, where the protocol information is used when transmitting a write packet for the write request to the storage location. In a non-low latency process, the protocol information may be generated after some number of other steps are executed. In the low latency write request process, the protocol information may be generated at about the same time as when the data for the write request is fetched from the host device. From that point, the protocol information accompanies the write data in a write packet, as the write packet is processed and transmitted.

I. Systems

FIG. 1 shows a host device 100 in communication with an I/O adapter device 102 according to one embodiment. However, one skilled in the relevant art will appreciate that the disclosed illustrative components are not meant to be an exhaustive identification of all the components required by or present in a host device 100. Rather, illustrative components have been identified, in a non-limiting manner, to facilitate illustration of one or more aspects of the present application. Still further, the illustrative components of the host device 100 can be considered logical in nature such that the physical implementation of one or more components can be varied or such that one or more of the logical components may be implemented in a virtualized manner. Additionally, one or more host devices 100 can share one or more of the illustrated components, such as processors, graphical processing units, memory and the like.

In an illustrative embodiment, the host device 100 is associated with various hardware components, software components and respective configurations that facilitate the execution of low latency write requests, which will be described in detail below. Specifically, in one embodiment, host device 100 can include a management controller 101 for managing the operation of host device 100 in accordance with the Intelligent Platform Management Interface ("IPMI"). Specifically, the management controller 101 can include an embedded microcontroller that manages the interface between system management software and host device 100 components.

In communication with the host device 100 is an I/O adapter device 102. Generally, the I/O adapter device 102 may include any device that inputs and/or outputs data along a communication channel 107. In one aspect, the I/O adapter device 102 can communicate as a standard bridge component for facilitating access between various physical and emulated components and a communication channel 107. In another aspect, the I/O adapter device 102 can include embedded microprocessors to allow the I/O adapter device to execute computer executable instructions related to the implementation of management functions or the management of one or more such management functions, or to execute other computer executable instructions related to the implementation of the I/O adapter device 102. In some embodiments, the I/O adapter device 102 may be implemented using multiple discrete hardware elements, such as multiple cards or other devices. The management controller 101 can be configured in such a way to be electrically isolated from any other component in the host device 100 other than the I/O adapter device 102. In some embodiments, the I/O adapter device 102 is attached externally to the host device 100. In some embodiments, the I/O adapter device 102 is internally integrated into the host device 100.

Also in communication with the I/O adapter device 102 may be an external communication port component 110 for establishing communication channels between the host device 100 and one or more network based services or other network-attached or direct-attached computing devices. Illustratively, the external communication port component 110 can correspond to a network switch, sometimes known as a Top of Rack ("TOR") switch. The I/O adapter device 102 can utilize the external communication port component 110 to maintain communication channels between one or more services and the host device 100, such as health check services, financial services, and the like.

The I/O adapter device 102 can also be in communication with a System Basic Input/Output System (SBIOS) component 105. The SBIOS component 105 can include non-transitory executable code, often referred to as firmware, which can be executed by one or more processors and used to cause components of the host device 100 to initialize and identify system devices such as the video display card, keyboard and mouse, hard disk drive, optical disc drive and other hardware. The SBIOS component 105 can also include or locate boot loader software that will be utilized to boot the host device 100. For example, in one embodiment, the SBIOS component 105 can include executable code that, when executed by a processor, causes the host device 100 to attempt to locate Preboot Execution Environment (PXE) boot software. Additionally, the SBIOS component 105 can include or takes the benefit of a hardware latch that is electrically controlled by the I/O adapter device 102. The hardware latch can restrict access to one or more aspects of the SBIOS component 105, such controlling modifications or configurations of the executable code maintained in the SBIOS component 105.

The SBIOS component 105 can be connected to (or in communication with) a number of additional computing device resources components, such as central processing units ("CPUs") 103, memory 106 (e.g., RAM), and the like. In one embodiment, such computing device resource components may be physical computing device resources in communication with other components via the communication channel 107. The communication channel 107 can correspond to one or more communication buses, such as a shared bus (e.g, a front side bus, a memory bus), a point-to-point bus such as a PCI or PCI Express bus, etc., in which the components of the bare metal host device 100 communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device 100. In such embodiments, the I/O adapter device 102 can implement a management process in which a host device is configured with physical or emulated hardware components based on a variety of criteria. The computing device resource components may be in communication with the I/O adapter device 102 via the communication channel 107. In addition, although communication channel 107 in FIG. 1 is shown as connecting all of components 101-106, it should be appreciated that a communication channel in accordance with some embodiments may connect any subset of the components 101-106 and/or other components. For example, a communication channel may connect a PCI Express device to a CPU via a northbridge or host bridge.

Also in communication with the I/O adapter device 102 via the communication channel 107 may be one or more controller components 104 for managing hard drives or other forms of memory. An example of a controller component 104 can be a SATA hard drive controller. Similar to the SBIOS component 105, the controller components 104 can include or take the benefit of a hardware latch that is electrically controlled by the I/O adapter device 102. The hardware latch can restrict access to one or more aspects of the controller component 104. Illustratively, the hardware latches may be controlled together or independently. For example, the I/O adapter device 102 may selectively close a hardware latch for one or more components based on a trust level associated with a particular customer. In another example, the I/O adapter device 102 may selectively close a hardware latch for one or more components based on a trust level associated with an author or distributor of the executable code to be executed by the I/O adapter device 102. In a further example, the I/O adapter device 102 may selectively close a hardware latch for one or more components based on a trust level associated with the component itself.

The host device 100 can also include additional components that are in communication with one or more of the illustrative components associated with the host device 100. Such components can include devices, such as one or more controllers 104 in combination with one or more peripheral devices 108, such as hard disks or other storage devices. Additionally, the additional components of the host device 100 can include another set of peripheral devices 109, such as Graphics Processing Units ("GPUs"). The peripheral devices 108 and 109 can also be associated with hardware latches for restricting access to one or more aspects of the component. As mentioned above, in one embodiment, the hardware latches may be controlled together or independently.

Figure 2:
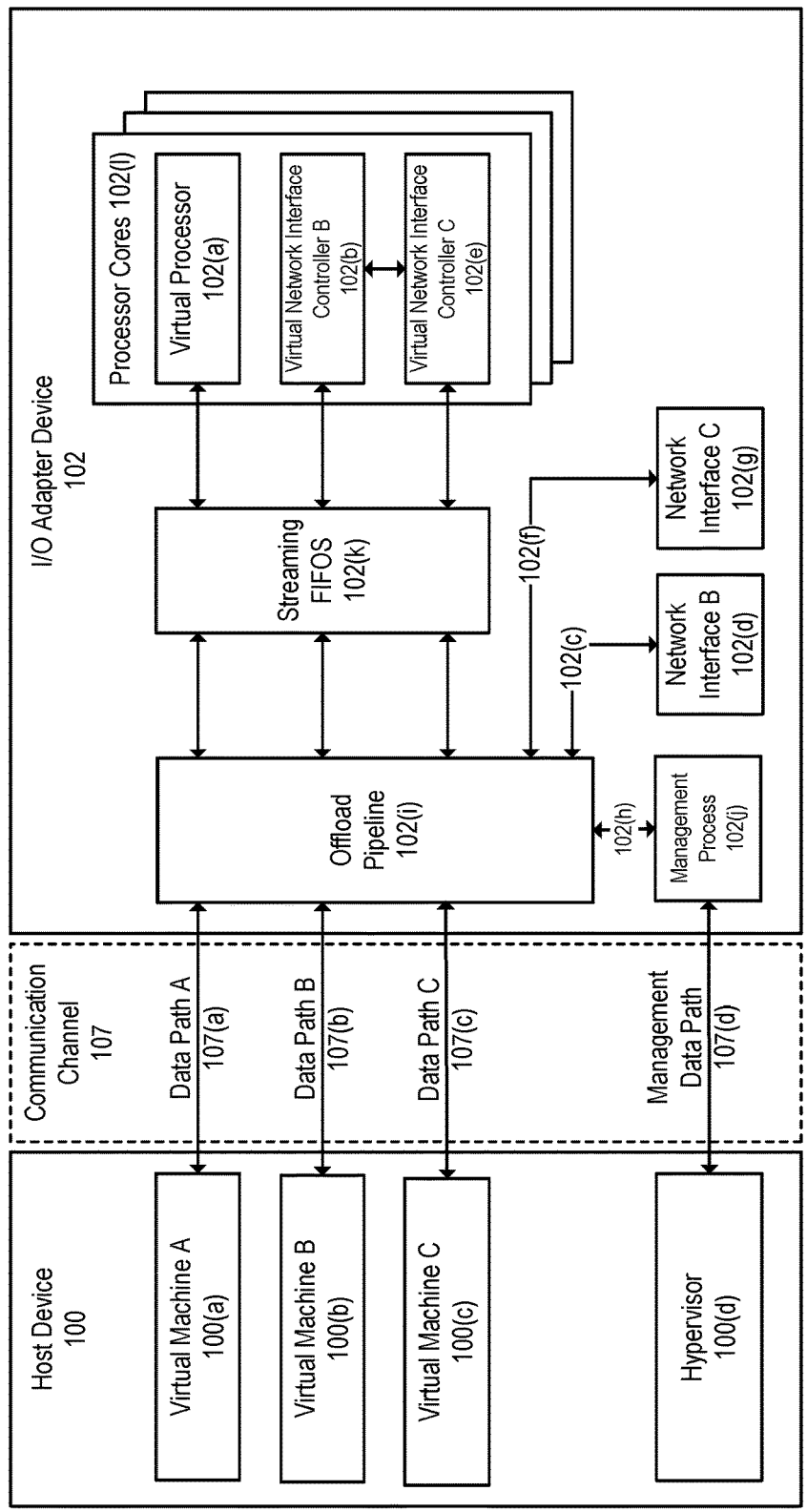
FIG. 2 illustrates one embodiment of communications between the host device and the I/O adapter device.

FIG. 2 illustrates one embodiment of communications between the host device 100 and the I/O adapter device 102. As shown in FIG. 2, the host device 100 may execute a plurality of processes, such as a virtual machines A-C 100(a)-(c) and a hypervisor 100(d). The I/O adapter device 102 may include an offload pipeline 102(i) for receiving and handling requests from the virtual machines 100(a)-(c). The I/O adapter device 102 may also include one or more processor cores 102(1). The I/O adapter device 102 may emulate a plurality of devices, such as virtual processor 102(a), and virtual network interface cards 102(b), 102(e), using the processor cores 102(1). The I/O adapter device 102 may also include a management process 102(h). Each of the above-described components of the host device 100 and the I/O adapter device 102 may communicate using data paths 107(a)-(d) over communication channel 107.

Virtual machine A 100(a) may be any suitable emulation of a computer system. Virtual machine A 100(a) may be in communication with a virtual processor 102(a) via a data path A 107(a). The virtual processor 102(a) may include one or more processing elements such as microprocessors. For example, the virtual processor 102(a) may include a general purpose graphical processing unit (GP-GPU), an application-specific instruction-set processor (ASIP), or another specialized processing element that may be better suited for certain tasks (e.g., secure billing and transaction processing) than the host device 100.

Virtual machine B 100(b) may also be any suitable emulation of a computer system. Virtual machine B 100(b) may be in communication with a virtual network interface controller (NIC) B 102(b) via the data path B 107(b). The network interface B 102(d) may be any suitable interface to a computer network. In one example, the network interface B 102(d) may be a physical Ethernet port. In another example, the network interface B 102(d) may be a virtual network interface that shares the same physical Ethernet port with one or more other virtual network interfaces. Virtual machine C 100(c) may similarly be in communication with the network interface C 102(g).

The virtual machines 100(a)-(c) running on the host device 100 may be managed by a hypervisor 100(d). The hypervisor 100(d) may, for example, be configured to create, start, monitor, stop, and delete virtual machines 100(a)-(c).

In addition, the hypervisor 100(d) may be configured to communicate with a management process 102(g) on the I/O adapter device 102 via a management data path 107(d). The management process 102(g) may be used to, for example, create or remove virtual devices such as the virtual offload processor 102(a), the virtual NIC B 102(b), and/or the virtual NIC C 102(e) and manage the offload pipeline 102(i) via an offload pipeline interface 102(h).

The virtual machines 100(a)-(c) may be assigned priorities. Priorities mean that the transactions initiated by one virtual machine 100(a) may take precedence over transactions initiated by another virtual machine 100(b). In some embodiments, the priorities may only take effect when the resources of the I/O adapter device 102 are heavily occupied. Priorities may take the form of service level agreements. A service level agreement may, for example, indicate an amount of resource usage permitted to a virtual machine 100(a)-(c). For example, service level agreements may indicate that a virtual machine 100(c) may only be allowed a certain amount of network bandwidth, host memory, and/or I/O adapter device 102 usage. I/O adapter device 102 usage may involve assigning a certain amount of buffer memory space to each virtual machine; thus, for example, service level agreements may indicate how much buffer memory space a virtual machine 100(a)-(c) is assigned.

Priorities may also apply to queues maintained by virtual machines 100(a)-(c). For example, in embodiments where the I/O adapter device 102 implements the Non-Volatile Memory Host Controller Interface Specification (NVMHCI, also called NVM Express or NVMe), a virtual device 102(a) may provide multiple queues, such as for example paired submission and completion queues. Commands are placed by the virtual machine 102(a) into a submission queue. Completions for those commands are placed in the associated completion queue. In some instances, the virtual device 102(a) may provide multiple submission queues. Priorities may be assigned to specific queues, or to specific queue pairs, such that transactions in one queue may take precedence over transactions in another queue. In some embodiments, priorities may not take effect until the I/O adapter device's 102 resources are heavily occupied.

Requests from the virtual machines 100(a)-(c) may be received and handled in the I/O adapter device 102 by an offload pipeline 102(i). The offload pipeline 102(i) may include a pipeline with individual units or streaming components for managing the steps to prepare and issue the requests to the network interfaces 102(d), 102(g). The offload pipeline 102(i) may also include buffer memory for intermediate storage of data associated with requests from the virtual machines 100(a)-(c). The offload pipeline 102(i) may communicate with the processor cores 102(1) and/or virtual devices 102(a), 102(b), 102(e) running on the processor cores 102(1) over one or more streaming FIFOs 102(k). In some instances, the offload pipeline 102(i) provides a fast path for servicing certain requests with lower complexity or certain aspects of the request with respect to the processor cores 102(1) executing on the I/O adapter device.

In some embodiments, "streaming" may refer to packet processing. For example, a streaming component may refer to a packet processing component that can perform one or more packet processing operations on a packet. In some instances, a streaming packet may refer to a sequence of packets. In certain implementations, a streaming packet may have additional information besides a packet header and a packet payload, such as packet information, used to facilitate routing and processing of the packet through the offload pipeline.

It should be noted that although certain virtual devices are shown as part of the I/O adapter device 102 of FIG. 2 (i.e., virtual processor 102(*a*) and virtual network interface cards B 102(*d*) and C 102(*g*)), embodiments may generally relate to any suitable virtual or physical I/O device. In addition, although in FIG. 2 virtual machines 100(*a*)-(*c*) and virtual devices 102(*a*), 102(*b*) and 102(*e*) have a one-to-one correspondence, in various embodiments a virtual machine may be associated with zero, one, or multiple virtual devices on an I/O adapter device. Furthermore, although FIG. 2 is described with reference to a plurality of virtual machines running on host device 100, it should be noted that in some embodiments host device 100 may run a single, non-virtualized operating system.

II. Write Requests

Figure 3:
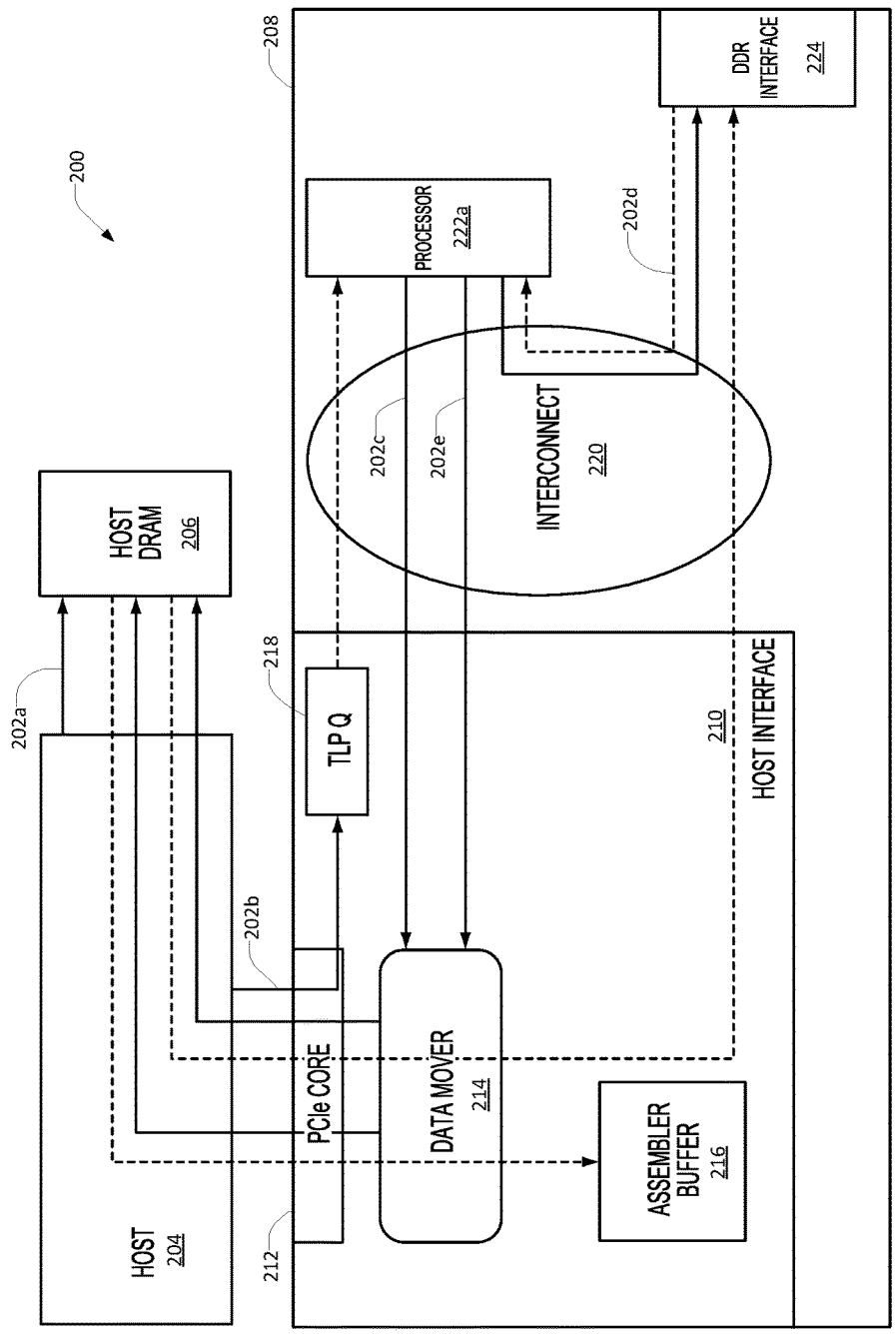
FIG. 3 illustrates one embodiment of a system implementing a storage write request, and the steps to execute the write request, where the write request may be targeted to a storage location.
Figure 4:
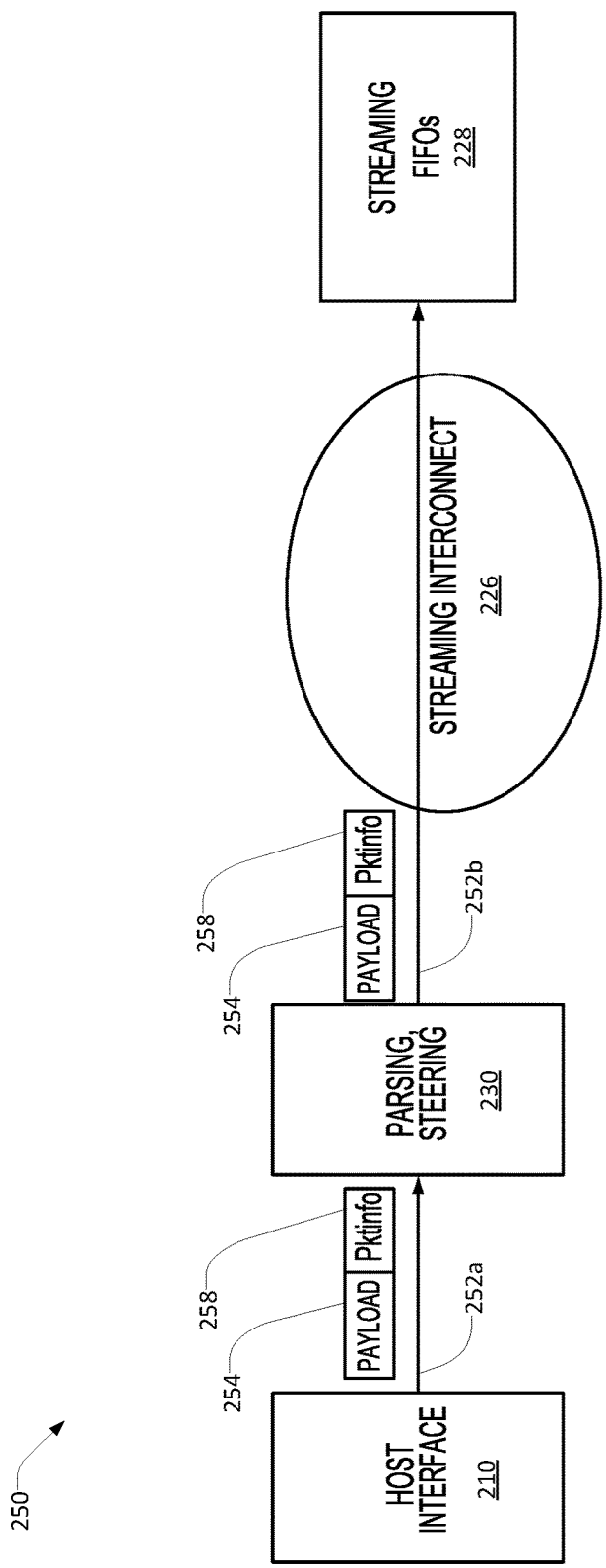
FIG. 4 illustrates one embodiment of a packet flow for moving a write packet for a write request described above through the preliminary stages of an offload pipeline, including the host interface.
Figure 5:
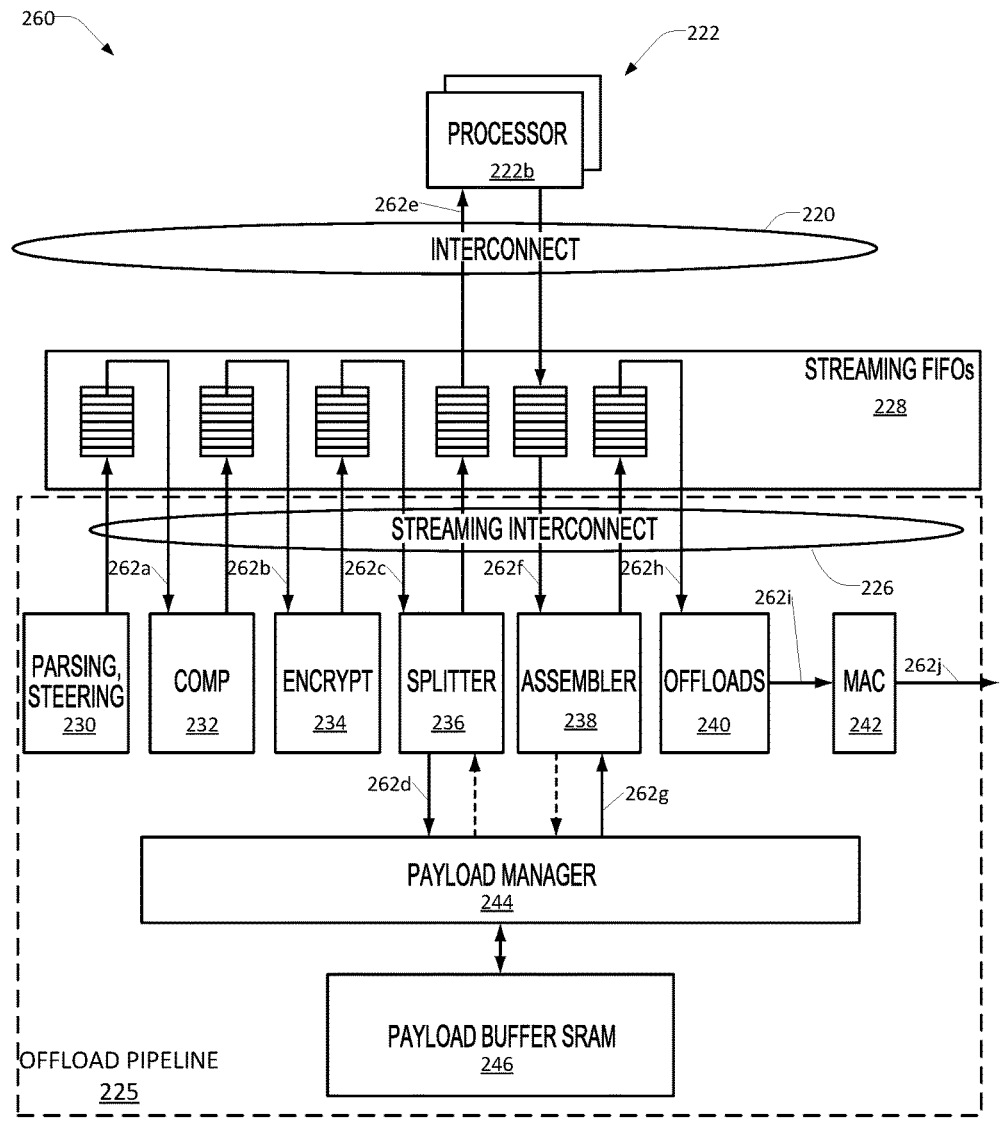
FIG. 5 illustrates one embodiment of a flow of the write packet through the offload pipeline of the I/O adapter device.

FIGS. 3-6 illustrate one embodiment of an I/O adapter device configured to process a write request. The I/O adapter may be configured to process a write request in more than one manner. For example, the I/O adapter device may include low latency write request processes, as described in further detail below. FIGS. 3-6 illustrate general and flexible write request processes, configured for most variants of write requests, special write cases, and management of errors. These figures illustrate how a write request is transferred from a virtual machine on a host device to an I/O adapter device (FIG. 3). The write requests are transferred from the host interface in the I/O adapter device to the I/O adapter device's offload pipeline (FIG. 4). Each of the write requests flow through the offload pipeline, where they are processed and sent to a storage location (FIG. 5). A write request will receive one or more responses from the storage location. These responses also flow through, and are processed by, the offload pipeline (FIG. 6), and once all responses are received, the I/O adapter device informs the virtual machine that the write request has completed.

FIG. 3 illustrates one embodiment of a system 200 for implementing a storage write request, and the steps to execute the write request, where the write request may be targeted to a storage location. The storage location may comprise, for example, a remote computing device, a network-attached storage device, and/or a direct-attached storage device. Direct-attached storage devices include storage devices directly attached to the host device. The write request is transferred from a virtual machine on a host device 204 to an I/O adapter device 208. In some instances, the write request originates from a virtual machine executing on, for example, the host device 204. The I/O adapter device processes the write request through an offload pipeline 225, and transmits the write request through a network interface port. The network interface port can be, for example, a 10 Gb, 25 Gb, or 50 Gb port or any other high data bandwidth interface port.

FIG. 3 illustrates one embodiment of the steps by which a write request may be transferred from a virtual machine on a host device 204 to an I/O adapter device 208. In some embodiments, the communication channel between the host 204 and the I/O adapter device takes the form of a PCIe interface; in such embodiments, the host interface 210 may include a PCIe core 212. It is understood that a PCIe interface is only given as an example, and that, as explained above, the communication channel can be implemented in other forms.

As a first step, the virtual machine on the host 204 posts 202*a* the write request by, for example, writing the data that is to be transmitted to a buffer in host DRAM 206. The virtual machine may also write other information about the write request to host DRAM 206, such as a packet descriptor, indicating where in the host DRAM 206 the write data is located.

As a second step, the virtual machine on the host 204 will notify 202*b* the I/O adapter device 208 that it has posted 202*a* the write request. In embodiments where the I/O adapter device 208 communicates with the host 204 over a PCIe communication channel, the I/O adapter device 208 implements a PCIe core 212 in its host interface 210. In such embodiments the notification 202*b* may take the form of a doorbell write. The doorbell write is steered to a Transaction Layer Packet (TLP) queue 218 that is associated with a designated processor 222*a*. The designated processor 222*a* is one of one or more processors included in some embodiments of the I/O adapter device. Any of the one or more processors may be designated for specific tasks, such as handling requests or specific types of requests from a specific virtual machine. For example, the designated processor 222*a* in this example may have been designated to handle the write requests from the virtual device. Individual processors may be implemented as ARM cores. The processors communicate with the host interface 210 through an interconnect 220. In some embodiments, such as embodiments in which the processors are implemented as ARM cores, the interconnect 220 can be an AXI interconnect.

As a third step, the write request is transferred from the host 204 to the I/O adapter device. The designated processor 222*a* instruct 202*c* a data mover 214 to fetch information for the write request from the host DRAM 206. For example, the data mover 214 may fetch the packet descriptor, which indicates where in the host DRAM 206 the write data is located. The packet descriptor, and/or other information about the write request, may be stored in a DDR through a DDR interface 224 on the I/O adapter device. In some embodiments, the designated processor 222*a* may have pre-fetched the packet descriptors, and thus not need to fetch the packet descriptors at this stage.

As a fourth step, the designated processor 222*a* may read 202*d* descriptor information from a DDR through the DDR interface 224 on the I/O adapter device 208. The descriptors stored in the DDR include information about the write request. For example, the descriptors may include the request type, the size of the data to be transferred by the request, where the host DRAM 206 the data is located, and/or where in the I/O adapter's payload buffer the data may be temporarily stored. Descriptors may be placed in the DDR when the write request is initially transferred to the I/O adapter device. The I/O adapter device 208 may add the descriptor to a list of descriptors. The I/O adapter device 208 may maintain a list or queue of descriptors, where the list or queue is used to track requests that are being processed or will be processed in the future. For example, the write request may be added to a submission queue. Descriptors are extracted from the submission queue when the associated write request is processed. The descriptor information may indicate that more descriptors should be fetched from the host DRAM 206.

As a fifth step, the processor 222*a* may initiate a request to fetch write data from the host DRAM 306. The designated processor 222*a* may instruct 202*e* the data mover 214 to fetch the write data from the host DRAM 206 and, in some embodiments, write the data to an assembler buffer 216. To fetch the write data host interface 210 may execute a memory access request to transfer the write data. A memory access request may take the form, for example, of a direct memory access (DMA) transaction. The assembler buffer 216 is a memory that serves as a temporary buffer to assemble packets that will be sent to the offload pipeline 225. This DMA transaction may only transfer a portion of the write data. In some embodiments the assembler buffer may be located in another unit, such as for example in the payload manager 244, described below. Some embodiments do not include the assembler buffer 216, and the DMA transaction transfers the write data to a payload buffer 246, described below.

The designated processor 222a may also instruct the data mover 214 to add packet information ("PktInfo") to the write data. The packet information may include information about the write request, such as the identity of the virtual machine that requested the write and information about the storage device to which the write is directed. The packet information may also include information for the offload pipeline, such as command for specific units in the offload pipeline.

FIG. 4 illustrates one embodiment of a packet flow 250 for moving a write packet for a write request described above through the preliminary stages of an offload pipeline 225, including the host interface 210. A write packet is a unit of data that is to be transmitted to the storage location. The write packet includes a header and a payload. The header includes information about the write request, such as for instance the location where the write data is to be written, the size of the write data, and/or error correction values, among other information. The header may further include protocol information that may be required to transmit the packet. The payload contains the write data.

First, the host interface 210 may send the write packet, containing the packet information 258 and packet payload 254, to a packet parsing and steering 230 unit. The packet payload 254 contains the write data fetched from the host DRAM 206. The parsing and steering unit 230 will next send the packet information 258 and packet payload 254 to a designated streaming FIFO 228 by way of a streaming interconnect 226. In some embodiments, the parsing and steering unit 230 may also initiate pre-fetching of a context for the virtual machine that initiated the write request. Streaming FIFOs 228 are described in further detail below.

FIG. 5 illustrates one embodiment of a flow 260 of the write packet through the offload pipeline 225 of the I/O adapter device 208. The offload pipeline 225 may be implemented as a combination of software and hardware. The offload pipeline 225 is illustrated here, by way of example, as including a number of streaming components, such as a parsing and steering 230 unit, a compression 232 unit, an encryption 234 unit, a splitter 236 unit, an assembler 238 unit, a network offloads 240 unit, a media access control (MAC) 242 unit, a payload manager 244, and a payload buffer 246. In some implementations, such streaming components may be implemented using hardware logic, such as ASIC, Field programmable Gate Arrays (FPGA) or similar digital hardware components that allow for some configurability enabled through one or more software interfaces. In some implementations, several streaming components may be included in hardware logic as subunits in the same system-on-a-chip (SOC). The offload pipeline 225 may include additional units not illustrated here, as necessary for other operations. In some embodiments, streaming FIFOs 228 enable passing of data between the units of the offload pipeline 225 and between the offload pipeline 225 and one or more processors 222. In some embodiments, the units of the offload pipeline 225 communicate with the streaming FIFOs 228 by way of a streaming interconnect 226. In some embodiments, the units or the streaming components of the offload pipeline 225 communicate with each other through the streaming interconnect 226, and to the processors 222 through the streaming FIFOs, by way of the streaming interconnect 226. In some implementations, the streaming components are configured to perform one or more packet processing operations for the I/O adapter device 208 and the streaming interconnect 226 is configured to route packets through the offload pipeline 225. The processors 222 communicate with the streaming FIFOs 228 through a separate interconnect 220. Software executed by the processors 222 may operate on the packet data. The operation of the offload pipeline 225 can be modified and adapted by modifying the software executed by the processors 222.

As explained above with reference to FIG. 4, and as illustrated in FIG. 5, the parsing and steering unit 230 directs the write packet to a streaming FIFO 228. From the streaming FIFO 228, the write packet's packet information and payload are passed 262a to a compression 232 unit. The compression 232 unit may compress the payload. The compression 232 unit may then pass 262b the packet information and compressed payload to an encryption 234 unit through another streaming FIFO 228. The encryption 234 unit may encrypt the payload; for example, the encryption 234 unit may include a flow based Advanced Encryption Standard-XEX-TCB-CTS (AES-XTS) encryption engine. The encryption 234 unit may pass 262c the packet information and encrypted payload to a splitter 236 unit, by way of another streaming FIFO 228. The splitter 236 unit may request 262d payload buffer space from a payload manager 244. The splitter 236 unit will place the write data payload in the payload buffer 246 at the designated space. The payload manager 244 may return a handle to the payload buffer 246. The splitter 236 unit may place the handle in the packet information and send 262e the packet information through a streaming FIFO 228 to a processor 222b.

The processor 222b may perform protocol processing on the packet information, such as for example any necessary processing to prepare the write packet for transmission by a specific network protocol. The processor 222b may create a packet header for the write packet, where the packet header contains any necessary network protocol information. The processor 222b may also update the packet information with information that the network offloads 240 unit may use to generate an error correction value, such as a checksum or cyclic redundancy check (CRC), for the packet header and/or packet payload. The processor 222b may pass 262f the packet information and packet header for the write packet to an assembler 238 unit, by way of a streaming FIFO 228.

The assembler 238 unit requests 262g the packet payload from the payload manager 244 and merges the payload with the packet information and the header. The buffer space used by the payload data is freed for other use. The assembler 238 unit passes 262h the packet, by way of a streaming FIFO 228, to the network offloads 240 unit. The network offloads unit 240 may perform stateless operations on the packet header and/or data, such as for instance checksum generation, UDP/IP checksum generation, and/or Ethernet CRC generation.

As described herein, embodiments may enable stateless operations on the portions of the write requests originating from a virtual machine host. "Stateless" here means that the network offloads 240 unit does not need to maintain state information between the individual related write requests. Write requests may be related, for example, when the data written by the requests comprises a single set of data. When a single portion of write data spans multiple write requests, an error correction value may be generated for each write data segment corresponding to each individual write request. Alternatively, a single error correction value for the entire write data, but a single error correction value would require maintaining the error correction state between the write requests. Doing so may require additional hardware and/or software, or additional processing by the processors 222. In some embodiments, however, the I/O adapter device 208 may nevertheless be configured to generate a single error correction value. In other embodiments, whether to generate one error correction value or multiple error correction values is configurable. The configuration may be determined on a per request basis, per virtual device basis, per virtual machine basis, and/or per queue basis, depending on how the I/O adapter device 208 is configured. Any method may be employed to generate the error correction value; hence the error correction value may be, for example, a CRC or a checksum.

The network offloads 240 unit will remove the packet information from the write packet, and send 262i the now completed write packet to a MAC 242 unit for transmission 262j on to the storage location.

Figure 6:
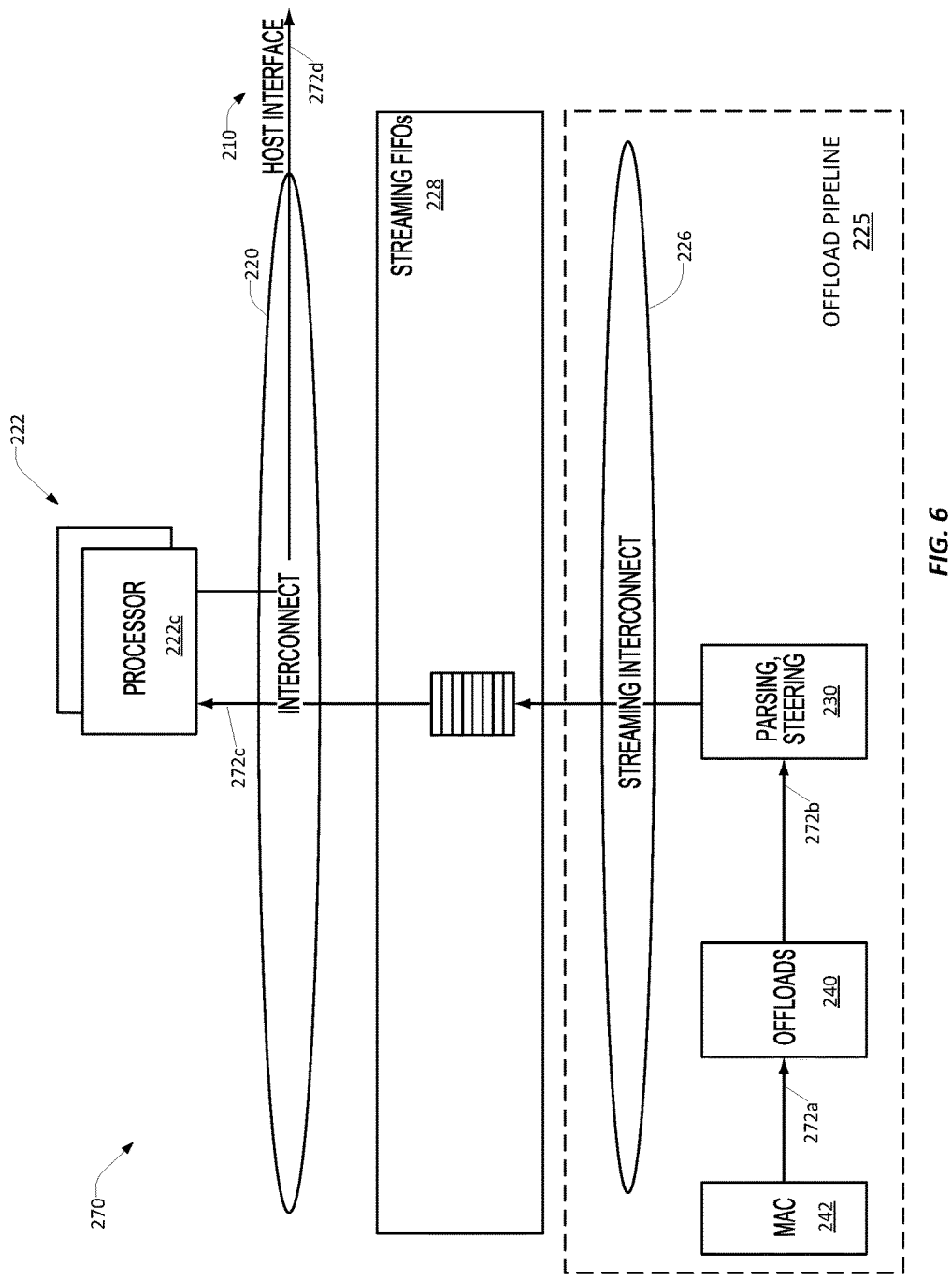
FIG. 6 illustrates one embodiment of a flow of a write response for a write request through the offload pipeline of the I/O adapter device.

FIG. 6 illustrates one embodiment of a flow 270 of a write response for a write request through the offload pipeline 225 of the I/O adapter device 208. The offload pipeline 225 is illustrated here, by way of example, as including a MAC 242 unit, a network offload 240 unit, and a parsing and steering 230 unit. The offload pipeline 225 may include additional units not illustrated here, as necessary for other operations. The write response will be sent by the storage location to which the write request was directed, and indicates that the write has completed. In some cases, the write response may indicate that an error occurred. In such cases, a processor 222c may examine the error and determine what, if anything, to do. In some cases, the processor 222c may inform the virtual machine that requested the write that an error occurred. In some embodiments, the processor 222c may handle the error and/or reissue the write request. In other embodiments, the offload pipeline 225 may be configured to reissue the write request without assistance from the processors 222c.

The flow 270 illustrated in FIG. 6 gives an example of a write response indicating that the write was successful. The write response packet for the write request is first received from the network at the MAC 242 unit. The MAC 242 unit passes 272a the response packet to the network offloads 240 unit. The network offloads 240 unit may perform stateless operations on the response packet, such as for instance checking an Ethernet CRC, IP or UDP checksum, or other error correction value included in the response packet. Any results of the stateless operations may be added to a packet information that is generated for the response packet. The network offloads 240 unit passes 272b the response packet to the parsing and steering 230 unit.

The parsing and steering 230 unit parses the packet header for the response packet and may determine that the response packet should be routed to a particular processor 222c that is associated with ingress traffic. The parsing and steering unit 230 will therefore place the packet header and packet information in a streaming FIFO 228, from which it will be passed 272c to the processor 222c. In some embodiments parsing and steering 230 unit may also start pre-fetching a context state for the virtual machine that requested the write.

The processor 222c may process the packet header and packet information. For example, the processor 222c may perform protocol processing, such as network protocol processing, using the packet header, packet information, and context, as well as any other information that was attached to the write request. The processor 222c may issue 272d a completion request to the host interface 210. The completion request contains sufficient information for the host interface 210 to inform the virtual machine that requested the write that the write completed successfully.

As noted earlier, the FIGS. 3-6 illustrate general and flexible write request processes, configured for most variants of write requests, special write cases, and management of errors. As such, the illustrated processes emphasize flexibility, possibly at the expense of speed and efficiency. The I/O adapter device may include processes for processing write requests that are faster and more efficient, and not necessarily less flexible.

III. Low Latency Write Requests

Figure 7:
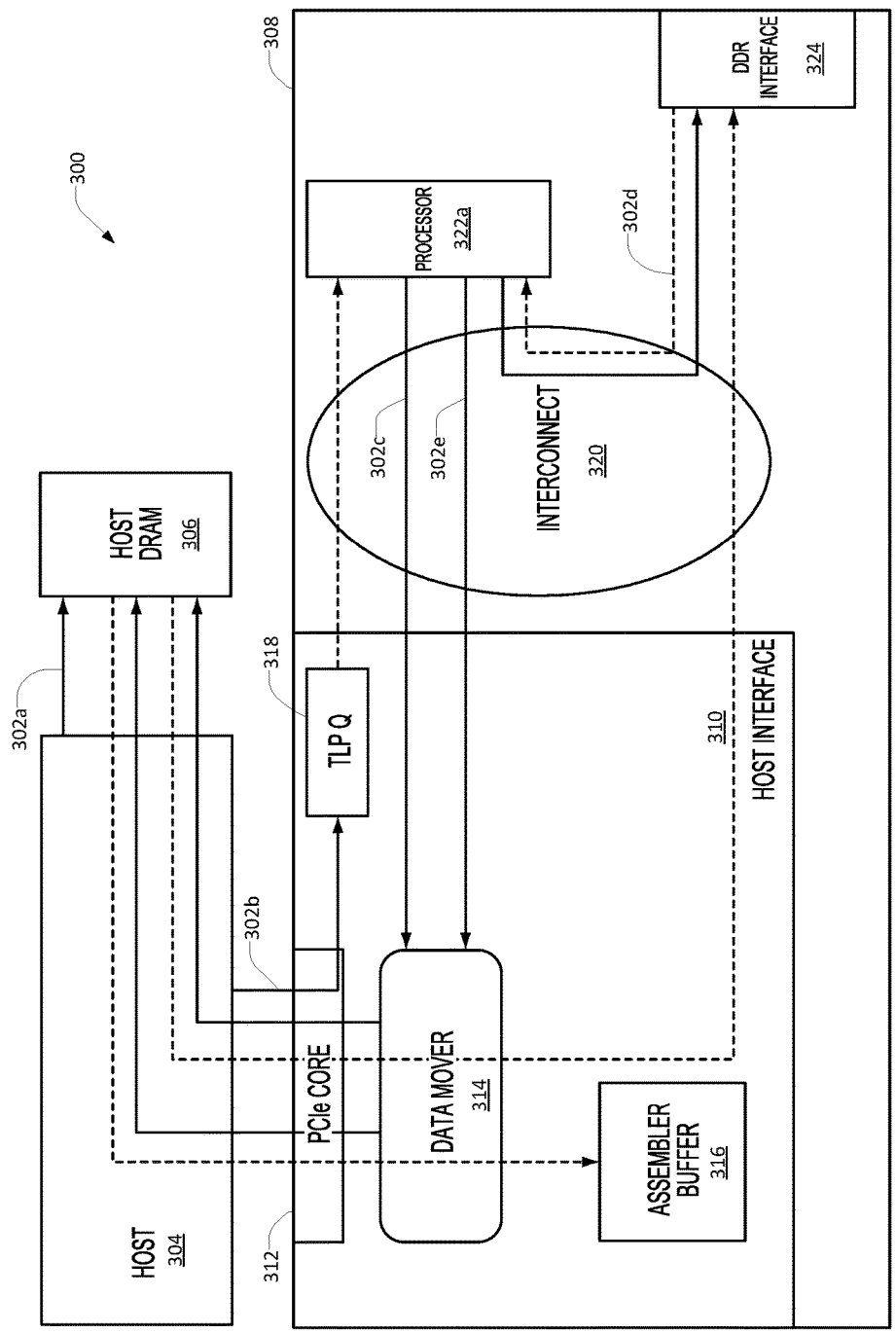
FIG. 7 illustrates one embodiment of a system for implementing a storage write request that may be processed as a low latency write request.
Figure 8:
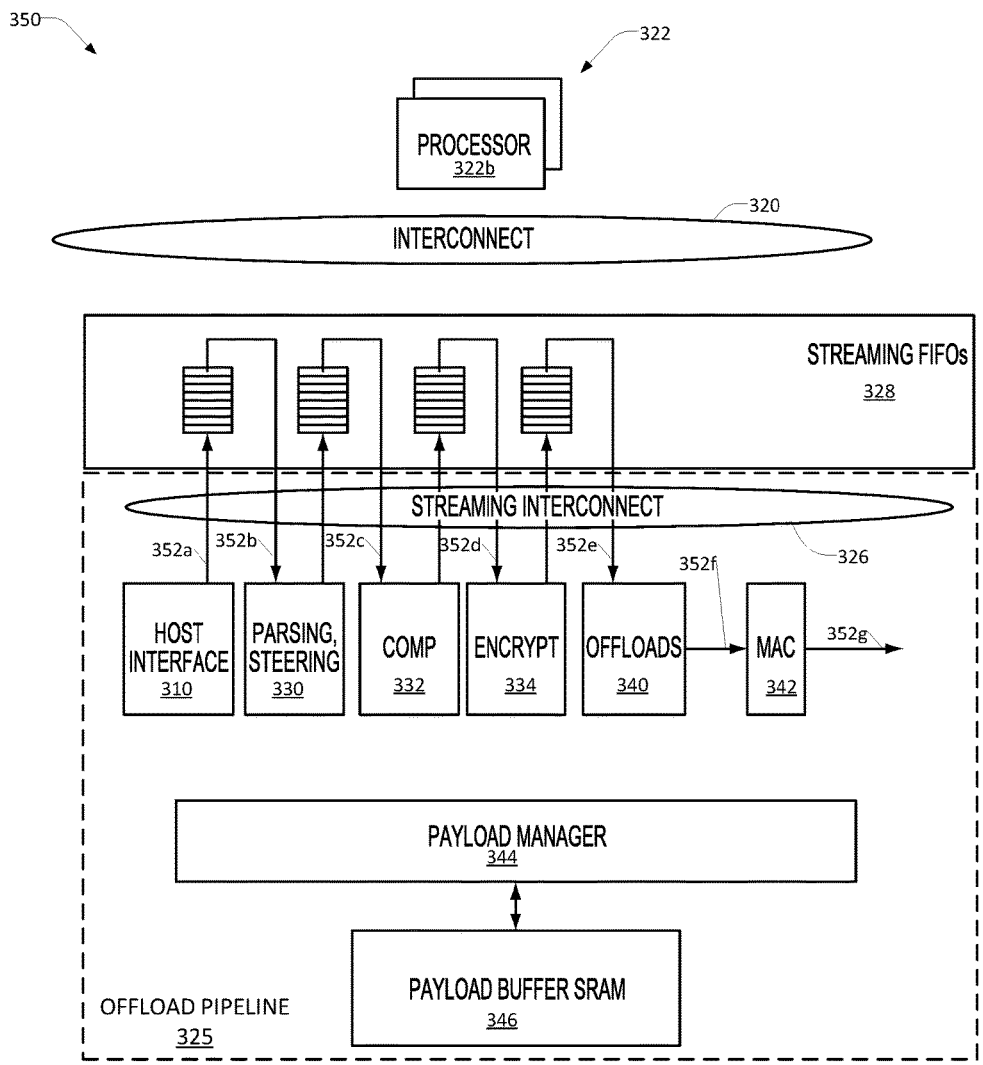
FIG. 8 illustrates one embodiment of a flow of a write packet through the offload pipeline 325 of the I/O adapter device.

FIGS. 7-8 illustrate one embodiment that illustrates an I/O adapter device configured to process a low latency write request. A low latency write request is a write request that the I/O adapter device can process with reduced or minimal usage of any of the I/O adapter device's processors. In some situations, an execution path that repeatedly interrupts the I/O adapter device's processors may be a slow path through the I/O adapter device. In some embodiments, for implementing low latency writes the I/O adapter device may include processes that reduce or minimize the use and interruption of processors. FIGS. 7-8 illustrate how a write request is transferred from a virtual machine on a host device to an I/O adapter device (FIG. 7). Here a write request may be identified as one that can be processed as a low latency write request, and initial low latency processing takes place. The low latency write request flows through, and is processed by, an offload pipeline in the I/O adapter device (FIG. 8). The low latency write request will subsequently receive one or more responses in a similar fashion as a non-low latency write request. Processes for receiving responses to write requests are described above with respect to FIG. 6.

FIG. 7 illustrates one embodiment of a system 300 for implementing a storage write request that may be processed as a low latency write request. Further illustrated are some of the steps to execute the low latency write request. A write request is first transferred from a virtual machine on a host device 304 to an I/O adapter device 308. This write request is an ordinary write request, generally indistinguishable from the write request discussed with respect to FIGS. 3-6. Returning to FIG. 7, in some instances, the write request originates from a virtual machine executing, for example, on the host device 304. The I/O adapter device may identify the write request as one that may be processed as a low latency write request.

FIG. 7 illustrates one embodiment of the steps by which a write request may be identified as one that may be processed as a low latency write request, and the steps to process a low latency write request. FIG. 7 also illustrates how the low latency write request may be transferred from a virtual machine to an I/O adapter device 308.

As a first step, the virtual machine on the host 304 posts 302a the write request by, for example, writing the data that is to be written to a buffer in host DRAM 306. The virtual machine may also write other information about the write request to host DRAM 306, such as a packet descriptor, indicating where in the host DRAM 306 the write data is located.

As a second step, the virtual machine on the host 304 will notify 302b the I/O adapter device 308 that it has posted 302a the write request. In some embodiments, the I/O adapter device 308 communicates with the host 304 over a PCIe communication channel. In such embodiments, the I/O adapter device 308 implements a PCIe core 312 in its host interface 310. In such embodiments the notification 302b may take the form of a doorbell write. The doorbell write is steered to a Transaction Layer Packet (TLP) queue 318 that is associated with a designated processor 322a. The designated processor 322a may one of one or more processors included by some embodiments of the I/O adapter device. Any of the one or more processors may be designated to process specific tasks. For example, in this example, the designated processor 322a may be designated to process write requests from the virtual machine. The processors communicate with the host interface 310 through an interconnect 320. In some embodiments, such as embodiments in which the processors are implemented as ARM cores, the interconnect 320 can be an AXI interconnect.

As a third step, the write request is transferred from the host 304 to the I/O adapter device. The designated processor 322a may instruct 302c a data mover 314 to fetch information for the write request from the host DRAM 306. For example, the data mover 314 may fetch the packet descriptor, which indicates where in the host DRAM 306 the write data is located. The packet descriptor, and/or other information about the write request, may be stored in a DDR through a DDR interface 324 on the I/O adapter device. In some embodiments, the designated processor 322a may have pre-fetched the packet descriptors, and thus may not need to fetch the packet descriptors at this stage.

At this step, the designated processor 322a may identify the write request as one that can be processed as a low latency write request. That is, the designated processor 322a may determine that a write packet for the write request can be processed by the I/O adapter's offload pipeline 325 without additional assistance from the one or more processors, other than the processing that takes place at this step. The designated processor 322a may make this determination based on one or more aspects of the write request. For example, the designated processor 322a may consider the size of the data being written by the write request. For example, a write request whose data can fit within a single write packet can be processed as a low latency write request. The size of a write packet may be determined by the transmission protocol used by the I/O adapter device to transmit the packet. For example, the protocol may specify a maximum transfer unit (MTU), and the size of the write packet may be defined in terms of multiples of MTUs. A write request with data of such size may not require additional processing by a processor. The designated processor 322a may consider other criteria, such as the write request's destination, the type or nature of the data being written, configuration information associated with the write request, and/or the protocol by which the write packet for the write request will be transmitted, among others.

The designated processor 322a may further recognize that some write requests have requirements that do not allow these write requests to be processed as low latency write requests. For example, the designated processor 322a may determine that the protocol by which the write packet will be transmitted requires additional packet headers, or modifications to the existing packet header. The additional or modified packet headers may be generated by a processor 322b, for example, after the write data has been compressed and encrypted, and before the write packet is transmitted. In another example, the designated processor 322a may determine that a state is to be maintained between the write request being processed and past and/or future write requests. A processor 322a may determine the present state and update the state based on the current write request. Other requirements may exist that identify a write request as one that cannot be processed as a low latency write request, and such requirements are not limited to the examples discussed here.

As a fourth step, the designated processor 322a may read 302d descriptor information from the DDR through the DDR interface 324 on the I/O adapter device 308. The descriptors stored in the DDR include information about the write request. For example, the descriptors may include the request type, the size of the data to be transferred by the request, where the host DRAM 306 the data is located, and/or where in the I/O adapter's payload buffer 346 the data may be temporarily stored. Descriptors may be placed in the DDR through the DDR interface 224 when the write request is initially transferred to the I/O adapter device. The I/O adapter device 308 may add the descriptor to a list of descriptors, where the list stores descriptor for pending requests. The descriptor information may indicate that more descriptors should be fetched from the host DRAM 306.

As a fifth step, the designated processor 322a may initiate a request to fetch write data from the host DRAM 306. At this step, the designated processor 322a may engage in low latency processing steps. The designated processor 322a may generate protocol information that the I/O adapter's offload pipeline 325 will use to transmit a write packet to the storage destination. Protocol information may include packet headers, such as for instance network headers, such as TCP/IP, UDP headers or protocol-specific headers. Protocol information may also include error correction values for the write data and or the packet header, such as for instance a checksum or CRC value. Protocol information may further include masks, configuration bits, and/or flags, as necessary for the transmission protocol. In some embodiments, the offload pipeline 325 may generate all or part of the protocol information. For example, in some embodiments, the host interface 310 may be configured to provide the protocol information. For example, the host interface 310 may include templates to generate standard packet headers, such as TCP/IP or UDP headers.

At this step, the designated processor 322a may also instruct 302e the data mover 314 to fetch the write data from the host DRAM 306. To fetch the write data the host interface 310 may, execute a memory access request to transfer the write data. A memory access request may take the form, for example, of a direct memory access (DMA) transaction. In some embodiments, the write data may be transferred from the host DRAM 306 to an assembler buffer 316. The assembler buffer 316 is a memory that serves as a temporary storage to assemble packets that will be sent to the offload pipeline 325.

At this step, the designated processor 322a may also transfer the generated protocol information from the designated processor 322a to the host interface 310. The protocol information is attached to the write data, and accompanies the write data as it is processed by the offload pipeline 325.

In some embodiments, at this step the designated processor 322a may also generate control information for the offload pipeline 325. Control information includes settings and/or commands for one or more of the units in the offload pipeline 325. The settings and/or commands may inform the offload pipeline 325 units how to process the write packet for the write request.

The designated processor 322a may also instruct the data mover 314 to add packet information ("PktInfo") to the write data. The packet information may include information about the write request, such as the identity of the virtual machine that requested the write and information about the storage location to which the write is directed. The packet information may also include information for the offload pipeline 325, such as command for specific units in the offload pipeline.

FIG. 8 illustrates one embodiment of a flow 325 of a write packet through the offload pipeline 325 of the I/O adapter device 308. The write packet includes a header and a payload. The packet header may include the protocol information generated earlier. The packet payload includes the write data. The offload pipeline 325 may be implemented in a combination of software and hardware. The offload pipeline 325 is illustrated here, by way of example, as including a number of streaming components, such as a host interface 310, a parsing and steering 330 unit, a compression 332 unit, an encryption 334 unit, a network offloads 340 unit, a MAC unit 342, a payload manager 344, and a payload buffer 346. The offload pipeline 325 may include additional units not illustrated here, as necessary for other operations. In some embodiments, streaming FIFOs 328 enable passing of data between the units of the offload pipeline 325 and between the offload pipeline 325 and one or more processors 322. In some embodiments, the units of the offload pipeline 325 communicate with the streaming FIFOs 328 by way of a streaming interconnect 326. In some embodiments, the units or the streaming components of the offload pipeline 325 communicate with each other through the streaming interconnect 326, and to the processors 322 through the streaming FIFOs, by way of the streaming interconnect 326. In some implementations, the streaming components are configured to perform one or more packet processing operations for the I/O adapter device 308 and the streaming interconnect 326 is configured to route part or all of a packet through the offload pipeline 325. The processors 322 communicate with the streaming FIFOs 328 through a separate interconnect 320. Software executed by the processors 322 may operate on the packet data. The operation of the offload pipeline 325 can be modified and adapted by modifying the software executed by the processors 322.

The flow 350 illustrated in FIG. 8 illustrates how the I/O adapter device 308 may process the write packet assembled according to the steps described with respect FIG. 7. As illustrated in FIG. 8, the host interface 310 transfers 352a the write packet to the parsing and steering 330 unit by way of a streaming FIFO 328. The parsing and steering 330 unit in turn directs the packet information and write packet together to an appropriate streaming FIFO 328 in order for the packet information and write packet to reach the next unit. From the streaming FIFO 328 the packet information and write packet are passed 352c to a compression 332 unit. The compression unit may compress the packet payload. The compression 332 unit passes 352d the packet information and the write packet to the encryption 334 unit. The encryption 334 unit may encrypt the packet payload. The encryption 334 unit passes 352e the packet information and write packet to a network offloads 340 unit. The network offloads 340 unit may perform stateless operations on the packet header and/or packet payload. For example, the network offloads 340 unit may generate an error correction value, such as a UDP or IP checksum, an Ethernet CRC, and/or some other error correction value. The network offloads 340 unit may also remove the packet information and send 352f only the write packet to the MAC 342 unit. The MAC 342 unit transmits 352g the write packet to the destination storage location.

In some cases, the network offloads 340 unit arbitrates between multiple packets being processed by the offload pipeline 325. The offload pipeline 325 can be processing multiple read, write, and other packets at the same time. For example, each unit of the offload pipeline 325 can be operating on a different packet at the same time. In some cases, one packet may need to be transmitted before another. For example, packet transmission order may be determined by quality of service requirements, priorities between virtual machines, virtual devices, queues, and/or requests, and/or service level agreements. Thus, for example, a higher priority packet may need to be transmitted ahead of a low latency write packet currently being processed. In such situations, the network offloads 340 unit may indicate that the payload for the write packet is to be moved to the payload buffer 346, using the payload manager 344. The network offloads 340 unit may then arbitrate between the write packet and a higher priority packet or packets, allowing the higher priority packets to proceed to the MAC 342 unit to be transmitted 352g. Once the high priority packets have proceeded to the MAC 342 unit, the payload for the low latency write packet may be retrieved from the payload buffer 346, and the write packet may proceed to the MAC 342 for transmission 352g.

As noted above, the low latency write request will receive a response just as would be received by a non-low latency write request. Receiving a response is described with respect to FIG. 6.

It should be noted that the flow 350 of FIG. 8 does not include passing any part of the write packet or the packet information to a processor 322b once the write packet starts flowing through the offload pipeline. This is because the write packet does not need any additional processing by a processor 322b. For example, for a non-low latency write request, the processors 322 may be visited during the flow 350 of FIG. 8 in order to generate protocol information for transmitting the write packet. In contrast, for the flow 350, the protocol information was generated at around the time the write data was fetched from the host 304, so the processors 322 need not be visited during the flow 350. It should also be noted that the flow 350 does not require accessing the payload buffer 346 to temporarily store the write data. In non-low latency write request processing, the write data may need to be stored temporarily while the processors 322 operate on the write packet or packet information. In the low latency write request flow 350, on the other hand, the processors 322 are not visited, and the write data flows with the packet header and packet information through the offload pipeline 325.

There are situations, however, where the offload pipeline 325 may encounter a condition that requires assistance from a processor 322b. That is to say, a write request may be in the midst of being processed as a low latency write request when a unit of the offload pipeline 325 identifies a condition that requires assistance from a processor 322b. In such cases, the unit that identified the condition may transmit the packet information, packet header, and/or packet payload to a processor 322b for a processor to operate on. The packet payload may also be temporarily stored in the payload buffer 346. The processing of the write request may no longer be as quick as without the condition, but detection of conditions allows the low latency write request processing to maintain the flexibility provided by non-low latency processing.

Conditions that may require assistance from a processor 322b include error conditions. Error conditions can occur at any stage of the offload pipeline 325. Examples of error conditions include compression errors, encryption errors, error correction value generation errors, and others. When a unit of the offload pipeline 325 encounters an error, the unit may direct the packet header, payload, and/or packet information to a processor 322*b* by way of the streaming FIFOs 328. The unit may also direct the payload to the payload manager 344 for temporary storage in the payload buffer 346. Upon being informed of the error, the processor 322*b* may attempt to determine the type of the error (i.e. compression or encryption or some other error). The processor 322*b* may then act to resolve the error. For example, the processor 322*b* may attempt corrective measures, such as giving additional instructions to the compression 332 unit or encryption 332 unit. Additionally or alternatively, the processor 322*b* may attempt to restart the processing of the write packet. Additionally or alternatively, the processor 322*b* may inform the virtual machine that requested the write that there was an error, and wait for instructions from the virtual machine. Additionally or alternatively, the processor 322*b* may abort the write packet and inform the virtual machine that the write packet was aborted. In some situations, even after taking corrective measures the error may not be resolved, and/or another attempt to process the write packet will result in an error. In such situations, the processor 322*b* may take additional attempts to resolve the error, or may abort the write packet.

Conditions that require assistance from a processor 322*b* also include processing steps that can be modified or elaborated upon by software. For example, in some situations a configuration (for example, in the write request) may indicate that the write data should undergo alternate or additional compression. The alternate or additional compression steps may be implemented by a process executed by the processor 322*b*. These steps may be executed on the write data by the processor 322*b*, for example, before or after the write data reaches the compression 332 unit. Other processing steps may be modified or elaborated upon by software, and such steps are not limited to compression. Additionally, other conditions may exist that require assistance from a processor 322*b*, other than those discussed here.

In the absence of such conditions, the low latency write request processes may process the write request with minimal usage of the I/O adapter device's processors. The low latency write request processes may thus process a write request faster and more efficiently than the general write request process described above.

Processes for retransmission requests may be similar to the processes for low latency write requests. A retransmission request is a request to retransmit previously transmitted write data. The previously transmitted write data may have be transmitted using low latency or non-low latency processes. The retransmission request may rebuild the write packet that was previously sent for the write data. A retransmission request may occur for a number of reasons. For example, the storage location may have encountered an error while storing the write data, and is requesting that the write data be sent again. Alternatively, the storage location may have been busy when the write packet arrived, and is requesting the write data to be sent again, when it is less busy. Another situation may be that the I/O adapter device did not receive a response to the write request, and so after some defined period of time is going to send a retransmit packet to send the write data again.

Because the retransmission request is for a previously processed write request, the I/O adapter device may be able to use similar steps as are used in processing a low latency write request to process the retransmission request. Thus, as in FIG. 7, a processor 322*a* may generate protocol information, including packet headers and any other protocol-specific information as needed to transmit the retransmit write packet. Alternatively or additionally, in some embodiments the processor 322*a* may access protocol information that was stored with the original write request was processed, such as for instance in the DDR. Also as in FIG. 7, the I/O adapter's 308 host interface 310 may execute a memory access request to fetch the write data from host DRAM 306. Once the I/O adapter 308 has the write data, it may associate the protocol information with the write data, and process a retransmit packet in same fashion as in FIG. 8, which illustrates processing of a low latency write packet.

In some embodiments, a retransmission request may be processed by the I/O adapter device without the processor steps described with respect to FIG. 7. In such embodiments, when the host interface 310 receives the write request from the host 304, the host interface 310 is able to supply any necessary protocol information. The host interface 310 may associate the protocol information with write data it has fetched from the host DRAM 306, and cause a retransmit packet to be processed as in FIG. 8.

IV. Methods

Figure 9:
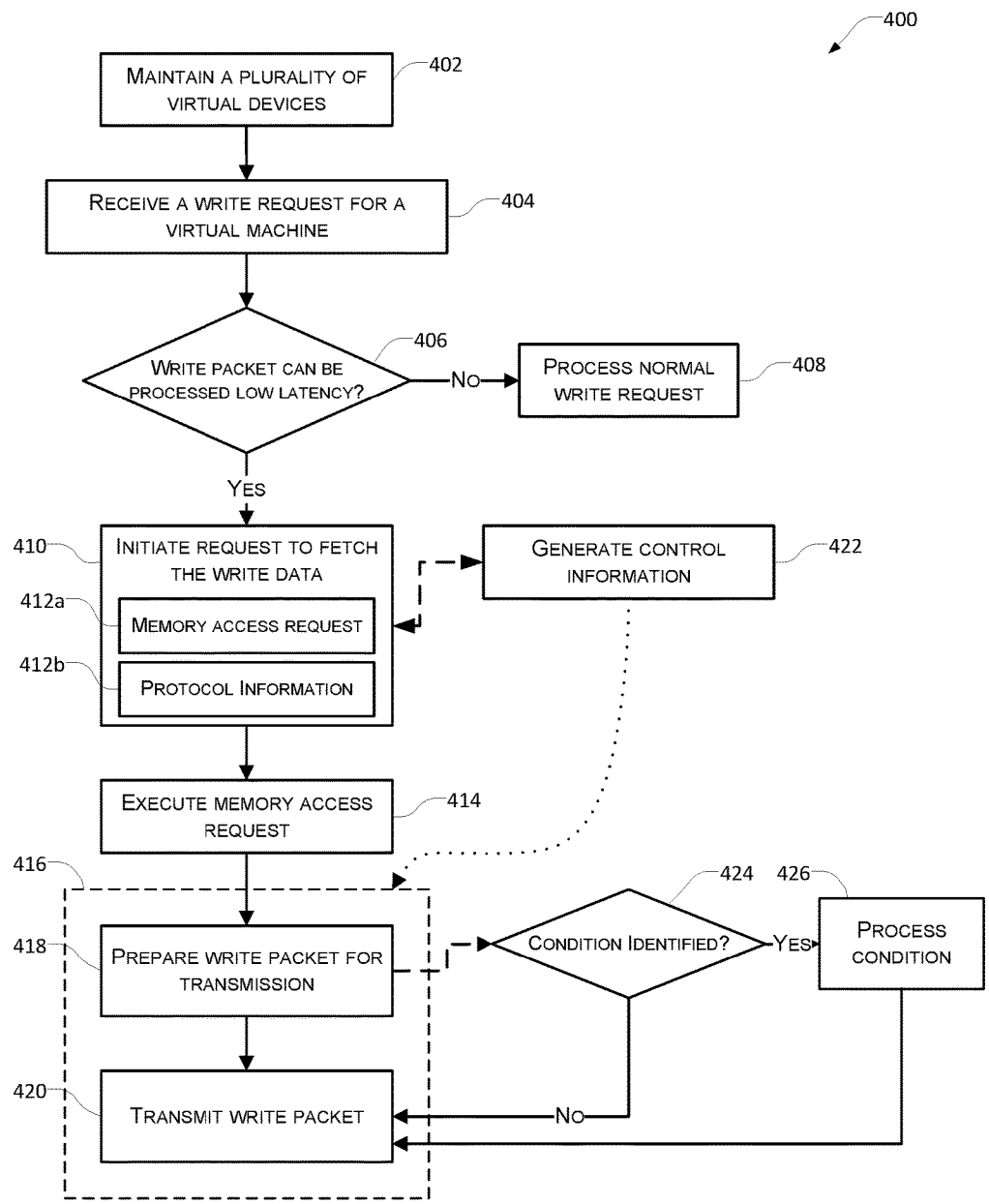
FIG. 9 illustrates one embodiment of a method for processing a write request as a low latency write request.
Figure 10:
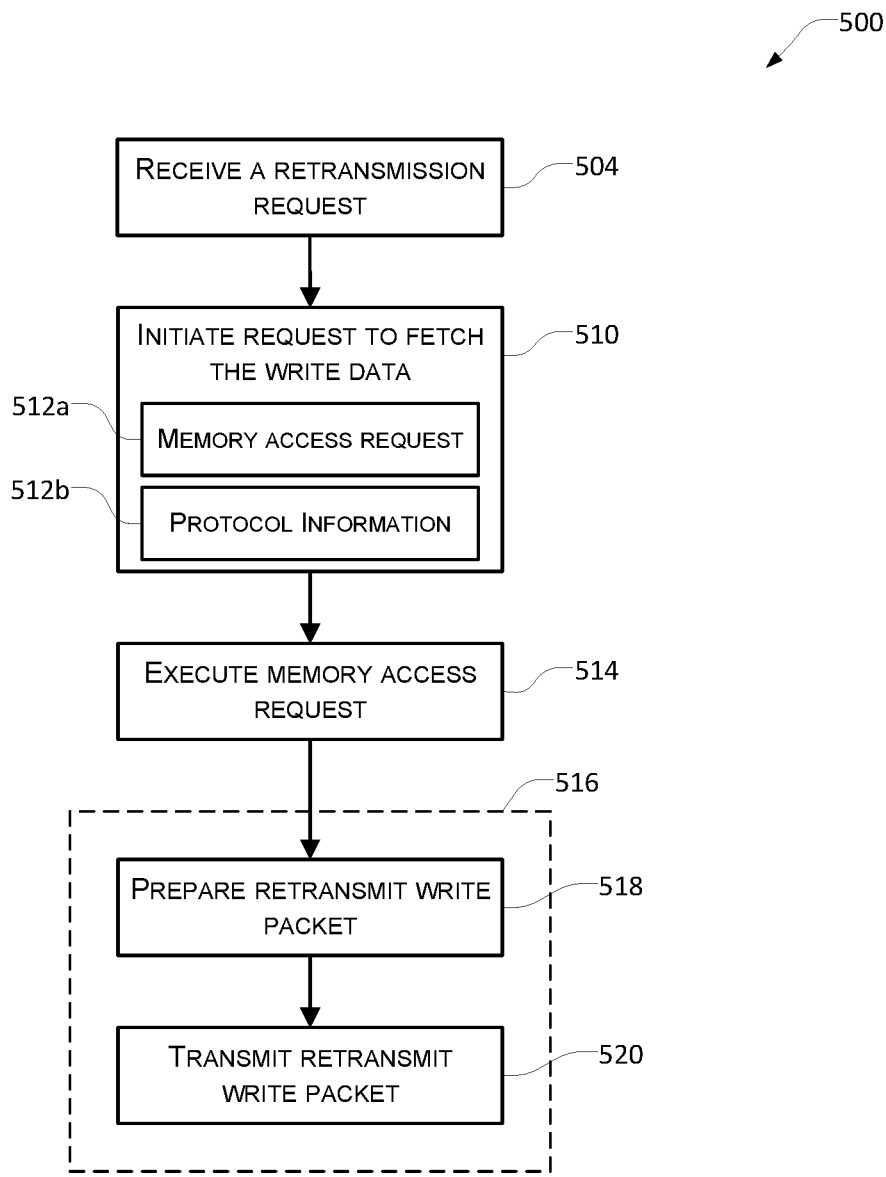
FIG. 10 describes a method for processing of a retransmission request.

FIG. 9-10 illustrate embodiments of methods for processing low latency write requests and related processes. These methods may be implemented by the systems described above.

FIG. 9 illustrates one embodiment of a process 400 for processing a write request as a low latency write request. The process 400 can be performed by the I/O adapter device 102 and/or one or more CPUs as illustrated in FIG. 1, or any other suitable combination of hardware, software, and/or firmware.

As illustrated in FIG. 9, at step 402 of the process 400 a plurality of virtual devices are maintained. Virtual devices such as these are described in relation to FIG. 2. As in FIG. 2, in FIG. 9 the virtual devices are operable to receive write requests from, for example, a host device and transmit write packets for those write requests to a storage location. The virtual devices will also receive responses to transmitted packets, and send a response virtual device that requested the write.

At step 404 a write request is received from a virtual machine. The virtual machine can be one such as is illustrated in FIG. 2. At step 406 of FIG. 9, the process 400 determines whether a write packet for the write request can be processed using the low latency write request processes. That is, the process 400 determines whether the write packet can be processed without additional assistance from the processor cores in the I/O adapter device. Additional processing would be in addition to the activities in the steps 410, 412 described below. When the write packet does require additional processing, the process 400 proceeds to step 408, and the write request is processed as a normal, non-low latency write request. When the write request can be processed without additional processing, the process 400 proceeds to step 410.

At step 410, the process 400 initiates a request to fetch the write data. The request includes a memory access request 412*a* and protocol information 412*b*. The memory access request 412*a* may take the form of, for example, a DMA request. Protocol information 412*b* may include packet headers, such as for instance network headers, such as TCP/IP headers or other headers. Protocol information 412*b* may also include error correction values for the write data and/or the packet header, such as for instance a checksum or CRC value. Protocol information 412*b* may further include masks, configuration bits, and/or flags, as necessary for the transmission protocol.

At step 414, the process 400 executes the memory access request to fetch the write data. The write data may be fetched from, for example, host DRAM.

The process 400 next enters a processes 416 a write packet for the write request. The write packet includes the fetched write data and the generated protocol information. Processing 416 the write packet includes at least two steps. First, at step 418 the write packet is prepared for transmission. This step may include operations such as compressing and/or encrypting the write data. Second, at step 420 the write packet is transmitted to the destination storage location according to the protocol information. The protocol information may provide configuration information that may be used at the time the write packet is transmitted.

The process 400 may also provide additional, optional steps. A first optional step is step 422. At step 422, the process 400 may generate control information, in addition to generating protocol information. The control information may be used by the I/O adapter device during the preparation step 418. The control information may provide settings and/or commands that control how the write packet is prepared. A second optional step is step 424. At step 424, the process 400 may identify a condition requiring assistance from a processor. A condition that requires assistance from a processor may occur during the preparation step 418. Such conditions include, for example, a determination that the write packet requires additional packet headers or modifications to existing packet headers. Another example condition is a determination that a state is being maintained between the current write request and past and/or future write request. Another example condition is a determination to use an alternate compression routing. Conditions may also include errors encountered during the preparation step. When a condition is identified, the process 400 proceeds to step 426 to process the condition. Otherwise, the process proceeds to step 420. Once the condition is processed, the process 400 also proceeds to step 420.

FIG. 10 illustrates one embodiment of process 500 that is related to the low latency write request process 400 described with respect to FIG. 9. The process 500 illustrated in FIG. 10 describes processing of a retransmission request. A retransmission request is a request to retransmit previously transmitted write data. The previously transmitted write data may have been transmitted either low latency or non-low latency. The retransmission request process 500 may rebuild the write packet that was previously sent for the write data. A retransmission request may occur for a number of reasons. For example, the storage location may have encountered an error while storing the write data, and is requesting that the write data be sent again. Alternatively, the storage location may have been busy when the write packet arrived, and is requesting the write data to be sent again, when it is less busy. Another situation may be that the I/O adapter device did not receive a response to the write request, and so after some defined period of time is going to send a retransmit packet to send the write data again.

As illustrated in FIG. 10, at step 504 of the process 500 the retransmission request is received. Because the retransmission request is for a previously processed write request, the process 500 may be able to use similar steps as are used in processing a low latency write request. Thus at step 510 the process 500 initiates a request to fetch the write data. The request may include a memory access request 512 and protocol information 512b. The protocol information 512b may include packet headers and any other protocol-specific information as needed to transmit the retransmit write packet. Alternatively or additionally, at step 510 the process 500 may access protocol information 512b that was stored with the original write request was processed.

At step 514 the process 500 executes a memory access request to fetch the write data. The write data may be fetched from the host, just as with the processing of the original write request.

Next the process 500 processes 516 a retransmit write packet. A retransmit write packet is similar to the write packet that was originally generated for the write request that is being retransmitted. The retransmit write packet may thus contain the same payload and header. In some embodiments, the retransmit write packet may contain additional or alternate information to indicate that it is a retransmit packet, or to otherwise distinguish it from the original write packet. The processing 516 step may include at least two steps. First, at step 518 the retransmit write packet is prepared for transmission. This step may include the same steps that were executed on the original write packet. Second, at step 520 the retransmit write packet is transmitted to the destination storage location according to the protocol information.

A retransmit request may thus be efficiently and expeditiously handled by the I/O adapter device. This is particularly when the retransmit request is for a write request that was processed as a low latency write request.

Some or all of the processes 400, 500 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

V. Computer Apparatus

Figure 11:
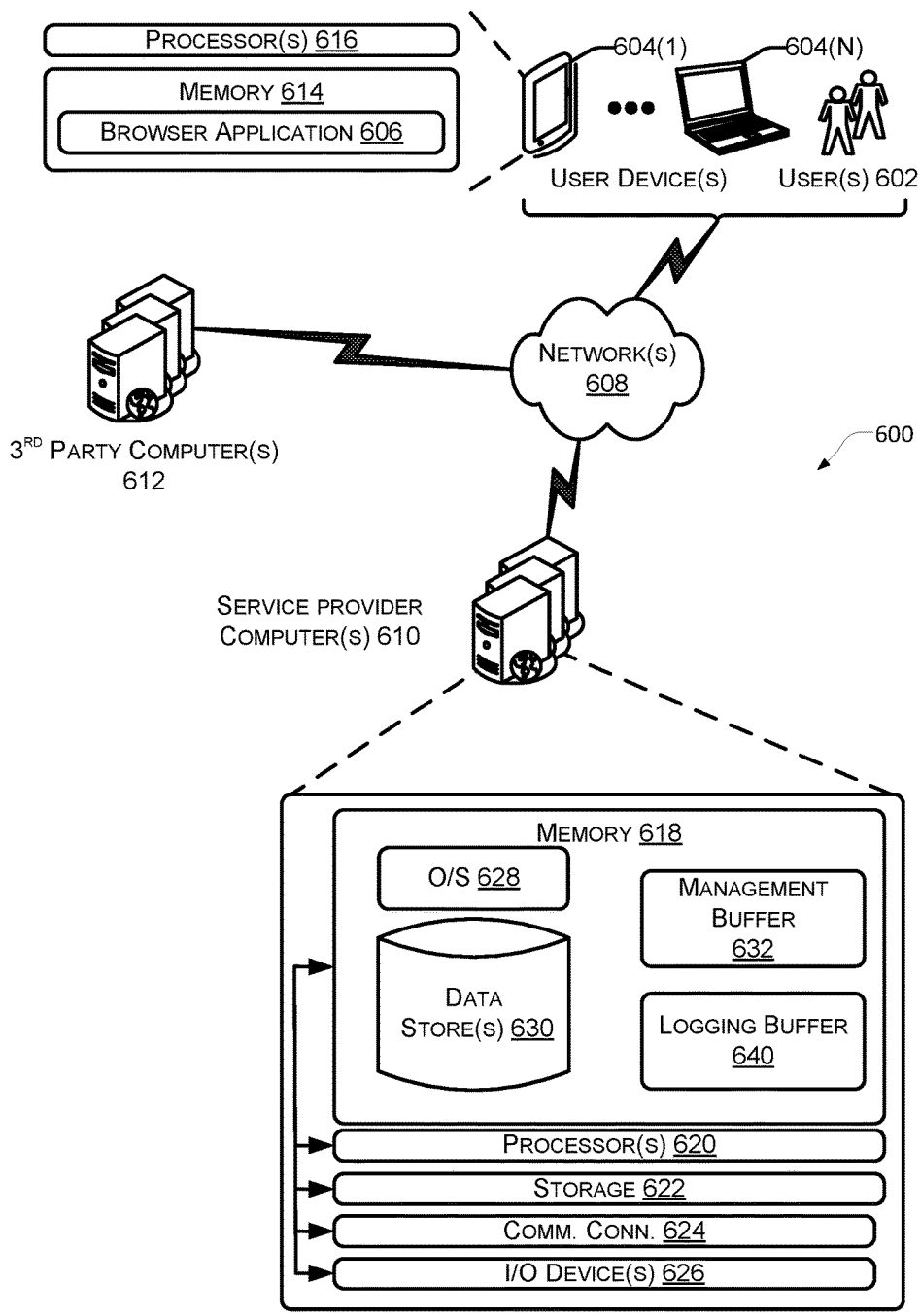
FIG. 11 illustrates an exemplary architecture for features and systems described herein that includes one or more service provider computers and/or a user device connected via one or more networks, according to at least one exemplary embodiment.

FIG. 11 illustrates an exemplary architecture for features and systems described herein that includes one or more service provider computers and/or a user device connected via one or more networks, according to at least one exemplary embodiment. The devices discussed in FIGS. 1-13, may use one or more components of the computing devices described in FIG. 11 or may represent one or more computing devices described in FIG. 11. In the illustrated architecture 600, one or more users 602 may use user computing devices 604(1)-(N) to access an application 606 (e.g., a web browser or mobile device application), via one or more networks 608. In some aspects, the application 606 may be hosted, managed and/or provided by a computing resources service or service provider. One or more service provider computers 610 may provide a native application which is configured to run on the user devices 604 which user(s) 602 may interact with. The service provider computer(s) 610 may, in some examples, provide computing resources such as, but not limited to, client entities, low latency data storage, durable data storage, data access, management, virtualization, cloud-based software solutions, electronic content performance management, etc. The service provider computer(s) 610 may also be operable to provide web hosting, computer application development and/or implementation platforms, combinations of the foregoing or the like to the user(s) 602. The service provider computer(s) 610, in some examples, may communicate with one or more third party computers 612.

In some examples, network(s) 608 may include any one or a combination of many different types of networks, such as cable networks, the Internet, wireless networks, cellular networks and other private and/or public networks. While the illustrated example represents the user(s) 602 accessing an application 606 over the network(s) 608, the described techniques may equally apply in instances where the user(s) 602 interact with the service provider computer(s) 610 via user device(s) 604 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, the application 606 may allow the user(s) 602 to interact with the service provider computer(s) 610 such as to access web content (e.g., web pages, music, video, etc.). The service provider computer(s) 610, which may be arranged in a cluster of servers or as a server farm, may host the application 606 and/or cloud-based software services. Other server architectures may also be used to host the application 606. The application 606 may be capable of handling requests from many users 602 and serving, in response, various item web pages. The application 606 can provide any type of website that supports user interaction, including social networking sites, online retailers, informational sites, blog sites, search engine sites, news and entertainment sites and so forth. As discussed above, the described techniques can similarly be implemented outside of the application 606, such as with other applications running on the user device(s) 604.

The user device(s) 604 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user device(s) 604 may be in communication with the service provider computer(s) 610 via the network(s) 608, or via other network connections. Additionally, the user device(s) 604 may be part of the distributed system managed by, controlled by or otherwise part of the service provider computer(s) 610 (e.g., a console device integrated with the service provider computers 610).

In one illustrative configuration, a user device(s) 604 may include at least one memory 614 and one or more processing units (or processor(s) 616). The processor(s) 616 may be implemented as appropriate in hardware, computer-executable instructions, firmware, or combinations thereof. Computer-executable instruction or firmware implementations of the processor(s) 616 may include computer-executable or machine-executable instructions written in any suitable programming language to perform the various functions described. The user device(s) 604 may also include geo-location devices (e.g., a global positioning system (GPS) device or the like) for providing and/or recording geographic location information associated with the user device(s) 604.

The memory 614 may store program instructions that are loadable and executable on the processor(s) 616, as well as data generated during the execution of these programs. Depending on the configuration and type of the user device(s) 604, the memory 614 may be volatile (such as random access memory (RAM)) and/or non-volatile (such as read-only memory (ROM), flash memory, etc.). The user device(s) 604 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, the memory 614 may include multiple different types of memory, such as static random access memory (SRAM), dynamic random access memory (DRAM), or ROM.

Turning to the contents of the memory 614 in more detail, the memory 614 may include an operating system and one or more application programs or services for implementing the features disclosed herein including at least a user provided input element or electronic service web page, such as via a browser application 606 or dedicated applications (e.g., smart phone applications, tablet applications, etc.). The browser application 606 may be configured to receive, store and/or display a website or other interface for interacting with the service provider computer(s) 610. Additionally, the memory 614 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 604.

In some aspects, the service provider computer(s) 610 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 610 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computer(s) 610 may be in communication with the user device(s) 604 and/or other service providers via the network(s) 608, or via other network connections. The service provider computer(s) 610 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, the service provider computer(s) 610 may include at least one memory 618 and one or more processing units (or processor(s) 620). The processor(s) 620 may be implemented as appropriate in hardware, computer-executable instructions, firmware or combinations thereof. Computer-executable instruction or firmware implementations of the processor(s) 620 may include computer-executable or machine-executable instructions written in any suitable programming language to perform the various functions described.

In some instances, the hardware processor(s) 620 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

The memory 618 may store program instructions that are loadable and executable on the processor(s) 620, as well as data generated during the execution of these programs. Depending on the configuration and type of the service provider computer(s) 610, the memory 618 may be volatile (such as RAM) and/or non-volatile (such as ROM, flash memory, etc.). The service provider computer(s) 610 or servers may also include additional storage 622, which may include removable storage and/or non-removable storage. The additional storage 622 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 618 may include multiple different types of memory, such as SRAM, DRAM, or ROM.

The memory 618, the additional storage 622, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. The memory 618 and the additional storage 622 are all examples of computer storage media. Additional types of computer storage media that may be present in the service provider computer(s) 610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 610. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

The service provider computer(s) 610 may also contain communications connection(s) 624 that allow the service provider computer(s) 610 to communicate with a stored database, another computing device or server, user terminals and/or other devices on the network(s) 608. The service provider computer(s) 610 may also include I/O device(s) 626, such as a keyboard, a mouse, a pen, a voice input device, a touch input device, a display, speakers, a printer and the like.

The memory 618 may include an operating system 628, one or more data stores 630 and/or one or more application programs or services for implementing the features disclosed herein, including a management buffer 632 and a logging buffer 640. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 11, and/or functions described herein can be provided by one or more modules that exist as separate modules and/or module functions described herein can be spread over multiple modules.

Figure 12:
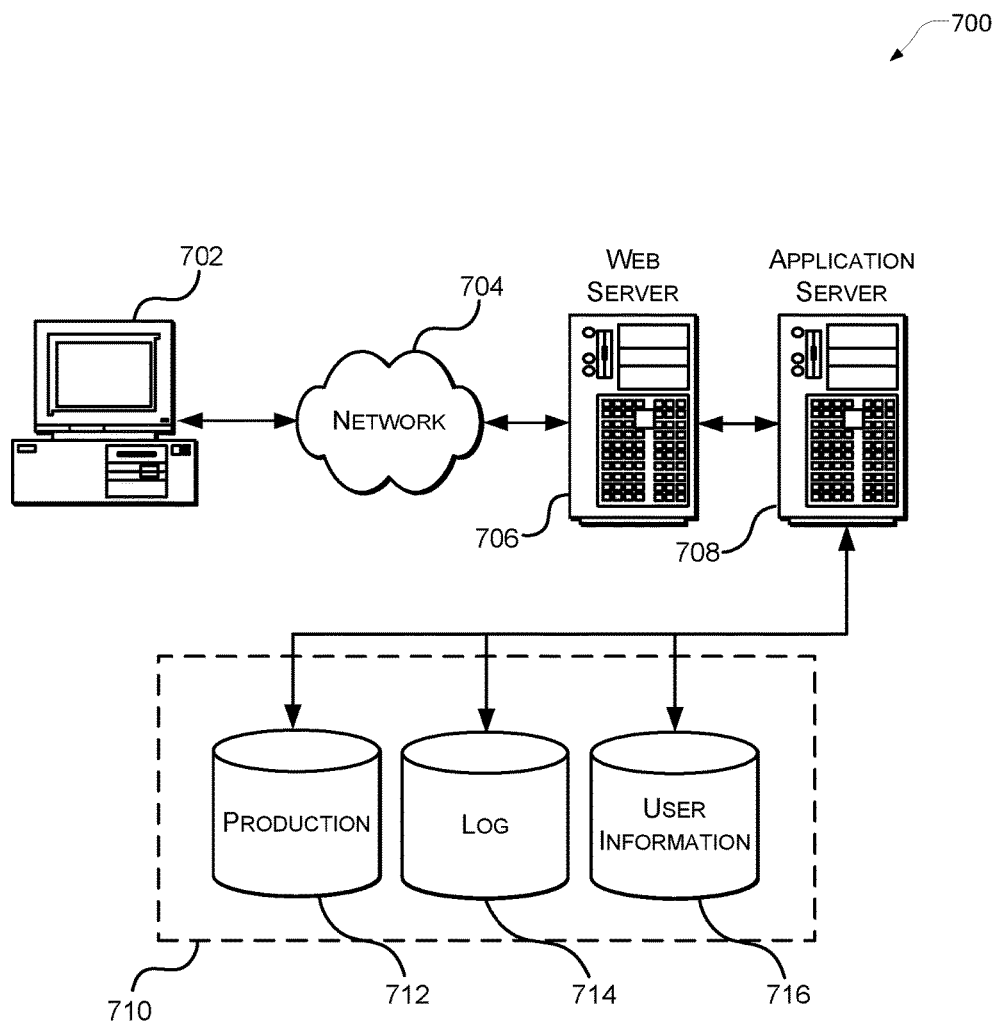
FIG. 12 illustrates aspects of an example environment for implementing aspects in accordance with various embodiments.

FIG. 12 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 700 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A Input/Output (I/O) adapter device, comprising:
a pipeline circuit; and
a processor circuit configured to execute a plurality of computer-executable instructions, wherein the plurality of computer-executable instructions, when executed by the processor circuit, causes the processor circuit to execute operations including:
receiving a write request from a host device coupled to the I/O adapter device;
upon determining to process the write request in a first mode, generating protocol information for the write request, wherein the protocol information includes information for transmitting a packet over a network; and
initiating a request to fetch data associated with the write request, wherein the request to fetch the data includes a memory access request and the protocol information;
and wherein the pipeline circuit is operable to:
execute the memory access request to fetch the data;
generate a packet for the write request, wherein the packet includes the protocol information and the data, and wherein, in accordance with the first mode, the pipeline circuit generates the packet without using the processor circuit;
transmit the packet according to the protocol information;
upon determining to retransmit the data, execute an additional memory access request to fetch the data;
generate an additional packet to retransmit the data, wherein the additional packet includes the data and the protocol information; and
transmit the additional packet.

2. The I/O adapter device of claim 1, wherein the pipeline circuit is further operable to:
receive a request over the network to retransmit the data, wherein determining to retransmit the data is based on the request.

3. The I/O adapter device of claim 1, wherein the pipeline circuit is further operable to:
determine, when a predetermined period of time has passed, that no response was received for the packet, wherein determining to retransmit the data is based on no response having been received.

4. The I/O adapter device of claim 1, wherein the additional packet includes a packet header from the packet.

5. The I/O adapter device of claim 1, wherein the plurality of computer-executable instructions further include instructions that, when executed by the processor circuit, causes the processor circuit to execute operations, including:

determining additional protocol information for retransmitting the data, wherein the additional packet includes the additional protocol information, and wherein the additional packet is transmitted according to the additional protocol information.

6. The I/O adapter device of claim 1, wherein, in accordance with the first mode, the pipeline circuit generates the additional packet without using the processor circuit.

7. The I/O adapter device of claim 1, wherein determining whether to process the write request in the first mode includes determining whether to process the write request in the first mode or a second mode, wherein, in the second mode, the pipeline circuit uses the processor circuit to generate a packet.

8. The I/O adapter device of claim 1, wherein determining to process the write request in the first mode is based on a configuration of the write request.

9. An apparatus, comprising:
a pipeline circuit; and
a processor circuit comprising one or more processing cores, wherein each processing core is configured to execute a respective plurality of computer-executable instructions, wherein the plurality of computer-executable instructions, when executed by the processor circuit, causes the processor circuit to execute operations including:
receiving a write request from a host device coupled to the I/O adapter device;
upon determining to process the write request in a first mode, generating protocol information for the write request, wherein the protocol information includes information for transmitting a packet over a network;
initiating a request to fetch data associated with the write request, wherein the request to fetch the data includes a memory access request and the protocol information; and
upon determining to retransmit the data, initiating an additional memory access request to fetch the data
and wherein the pipeline circuit is configured to:
execute the memory access request to fetch the data;
generate a packet for the write request, wherein the packet includes the protocol information and the data, and wherein, in accordance with the first mode, the pipeline circuit generates the packet without using the processor circuit;
transmit the packet according to the protocol information;
execute the additional memory access request to fetch the data;
generate an additional packet to retransmit the data, wherein the additional packet includes the data and the protocol information; and
transmit the additional packet according to the protocol information.

10. The apparatus of claim 9, wherein determining to retransmit the data is based on a request received over the network to retransmit the data.

11. The apparatus of claim 9, wherein the pipeline circuit is further operable to:
determine, when a predetermined period of time has passed, that no response was received for the packet, wherein determining to retransmit the data is based on no response having been received.

12. The apparatus of claim 9, wherein the additional packet includes a packet header from the packet.

13. The apparatus of claim 9, wherein the plurality of computer-executable instructions further include instructions that, when executed by a processing core, causes the processing core to execute operations, including:
determining additional protocol information for retransmitting the data, wherein the additional packet includes the additional protocol information, and wherein the additional packet is transmitted according to the additional protocol information.

14. The apparatus of claim 9, wherein, in accordance with the first mode, the pipeline circuit generates the additional packet without using the processor circuit.

15. The apparatus of claim 9, wherein determining whether to process the write request in the first mode includes determining whether to process the write request in the first mode or a second mode, wherein, in the second mode, the pipeline circuit uses the processor circuit to generate a packet.

16. A computer-implemented method, comprising:
receiving, by an Input/Output (I/O) adapter device coupled to a host device, a write request from the host device, wherein the write request is received at a processor of the I/O adapter device;
determining, by the processor, whether to process the write request in a first mode;
upon determining to process the write request in the first mode, generating, by the processor, protocol information for the write request, wherein the protocol information includes information for transmitting a packet over a network;
initiating, by the processor, a request to fetch data associated with the write request, wherein the request to fetch the data includes a memory access request and protocol information;
executing, by a pipeline circuit of the I/O adapter device, the memory access request to fetch the data;
generating, by the pipeline circuit, a packet for the write request, wherein the packet includes the protocol information and the data, and wherein, in accordance with the first mode, the pipeline circuit generates the packet without using a processor circuit;
transmitting the packet according to the protocol information;
determining to retransmit the data;
upon determining to retransmit the data, executing an additional memory access request to fetch the data;
generating an additional packet to retransmit the data, wherein the additional packet includes the data and the protocol information; and
transmitting the additional packet according to the protocol information.

17. The computer-implemented method of claim 16, wherein determining to retransmit the data is based on a request received over the network to retransmit the data.

18. The computer-implemented method of claim 16, further comprising:
determining, when a predetermined period of time has passed, that no response was received for the packet, wherein determining to retransmit the data is based on no response having been received.

19. The computer-implemented method of claim 16, wherein, in accordance with the first mode, the pipeline circuit generates the additional packet without using the processor circuit.

20. The computer-implemented method of claim 16, wherein determining whether to process the write request in the first mode includes determining whether to process the write request in the first mode or a second mode, wherein, in the second mode, the pipeline circuit uses the processor circuit to generate a packet.

* * * * *